(12) United States Patent
Hasselgren et al.

(10) Patent No.: US 11,610,370 B2
(45) Date of Patent: Mar. 21, 2023

(54) JOINT SHAPE AND APPEARANCE OPTIMIZATION THROUGH TOPOLOGY SAMPLING

(71) Applicant: NVIDIA Corporation, Santa Clara, CA (US)

(72) Inventors: Jon Niklas Theodor Hasselgren, Bunkeflostrand (SE); Carl Jacob Munkberg, Malmö (SE)

(73) Assignee: NVIDIA Corporation, Santa Clara, CA (US)

( * ) Notice: Subject to any disclaimer, the term of this patent is extended or adjusted under 35 U.S.C. 154(b) by 8 days.

(21) Appl. No.: 17/459,223

(22) Filed: Aug. 27, 2021

(65) Prior Publication Data

US 2022/0392160 A1    Dec. 8, 2022

Related U.S. Application Data

(60) Provisional application No. 63/195,301, filed on Jun. 1, 2021.

(51) Int. Cl.
G06T 17/20    (2006.01)
(52) U.S. Cl.
CPC ..................... G06T 17/20 (2013.01)
(58) Field of Classification Search
None
See application file for complete search history.

(56) References Cited

U.S. PATENT DOCUMENTS

| 10,403,037 B1* | 9/2019 | Boardman | G06K 9/6256 |
| 2021/0186659 A1* | 6/2021 | Li | G06T 19/20 |
| 2022/0215266 A1* | 7/2022 | Venkataraman | G06N 3/0454 |

OTHER PUBLICATIONS

Yifan, Wang, et al. "Differentiable surface splatting for point-based geometry processing." ACM Transactions on Graphics (TOG) 38.6 (2019): 1-14.*
Gao, J., et al., "Learning Deformable Tetrahedral Meshes for 3D Reconstruction," In Advances in Neural Information Processing Systems.

(Continued)

*Primary Examiner* — Sultana M Zalalee
(74) *Attorney, Agent, or Firm* — Leydig, Voit & Mayer, Ltd.

(57) ABSTRACT

Systems and methods enable optimization of a 3D model representation comprising the shape and appearance of a particular 3D scene or object. The opaque 3D mesh (e.g., vertex positions and corresponding topology) and spatially varying material attributes are jointly optimized based on image space losses to match multiple image observations (e.g., reference images of the reference 3D scene or object). A geometric topology defines faces and/or cells in the opaque 3D mesh that are visible and may be randomly initialized and optimized through training based on the image space losses. Applying the geometry topology to an opaque 3D mesh for learning the shape improves accuracy of silhouette edges and performance compared with using transparent mesh representations. In contrast with approaches that require an initial guess for the topology and/or an exhaustive testing of possible geometric topologies, the 3D model representation is learned based on image space differences without requiring an initial guess.

24 Claims, 17 Drawing Sheets

(56) References Cited

OTHER PUBLICATIONS

Laine, S., et al., "Modular Primitives for High-Performance Differentiable Rendering," ACM Transactions on Graphics 39, 6, Article 194 (2020).

Liao, Y., et al., "Deep Marching Cubes: Learning Explicit Surface Representations," In Conference on Computer Vision and Pattern Recognition (CVPR).

* cited by examiner

JOINT SHAPE AND APPEARANCE OPTIMIZATION THROUGH TOPOLOGY SAMPLING

CLAIM OF PRIORITY

This application claims the benefit of U.S. Provisional Application No. 63/195,301 titled "JOINT SHAPE AND APPEARANCE OPTIMIZATION THROUGH MONTE CARLO SAMPLED TOPOLOGIES," filed Jun. 1, 2021, the entire contents of which is incorporated herein by reference.

BACKGROUND

Synthesizing images of objects with complex shapes and appearances is a central goal in computer graphics. The problem can be broken down into choosing suitable representations for shape and appearance of the objects, modeling a three-dimensional (3D) scene according to the chosen representations, and finally, rendering the scene efficiently. Creating a shape and appearance model for a particular 3D scene is inherently an inverse problem: seeking a 3D model representation that will, when rendered, result in a two-dimensional (2D) image that appears as desired. Over multiple iterations, inverse rendering is used to iteratively recover a shape, lighting, and material properties of a 3D model based on reference images of the 3D scene being modeled.

Prior art techniques typically rely on an initial volumetric mesh or 3D model (cube, sphere, etc.) that is determined based at least in part on reference images (or reference 3D model). Other techniques rely on training using all possible topologies of a uniform volumetric mesh and are expensive to implement in terms of execution time. For example, the deep marching cubes technique evaluates 140 possible topologies for each cube within a uniform 3D grid. Still other techniques produce 3D models that suffer geometric inaccuracies. There is a need for addressing these issues and/or other issues associated with the prior art.

SUMMARY

Embodiments of the present disclosure relate to joint shape and appearance optimization through topology sampling. Systems and methods are disclosed that enable optimization of a 3D model representation comprising the shape and appearance of a particular 3D scene or object. In an embodiment, an initial guess of a geometric topology using some knowledge of the 3D scene or object is not needed. In an embodiment, a geometric topology defines cells (e.g., 3D grid, packed tetrahedra) and/or faces of cells (e.g., triangles, quads, etc.) of a volumetric mesh that are visible (e.g., enabled, active, included). The geometric topology may be randomly initialized and optimized through training based on image space losses. Applying the geometric topology to an opaque 3D mesh for learning the shape improves accuracy of silhouette edges and performance compared with using transparent mesh representations. In contrast with approaches that require an initial guess for the topology and/or an exhaustive testing of possible geometric topologies, the geometry topology is learned based on image space differences without requiring an initial guess. Appearance driven 3D model extraction has a number of uses, such as creating multiple level-of-detail renderings of complex scenes, conversion between different rendering systems, and even conversion between different geometric scene representations.

In an embodiment, the opaque 3D mesh (e.g., vertex positions and corresponding topology defining connections between the vertex positions to form faces of a surface or volume) and spatially varying material attributes of the 3D model representation are jointly optimized based on image space losses to match multiple image observations (e.g., reference images of the reference 3D scene or object). The 3D model representation is rendered by a differentiable renderer to produce rendered images corresponding to the reference images. The image space losses are calculated based on computed probability values associated with faces contained in the volumetric mesh and differences between the reference and rendered images. Higher probability values correspond to a higher likelihood that the face is included in the 3D model representation. Therefore, faces or cells associated with a probability value of zero (or below a minimum threshold value) may be removed from the 3D model representation (cells are not inserted based on the probability values). The image space loss is backpropagated update learned parameters used to generate the 3D model representation and probability values.

A method, computer readable medium, and system are disclosed for joint shape and appearance optimization through topology sampling. In an embodiment, a method for constructing a 3D model comprises receiving a 3D topology definition that identifies faces of cells within a volumetric mesh and processing the 3D topology and the volumetric mesh according to parameters to predict a 3D model representation corresponding to a reference 3D model, where the 3D model representation comprises a surface mesh. In an embodiment, the surface mesh is a list of vertex positions of the faces and a topology that defines connections between active faces of the cells. During optimization, the volumetric mesh is modified and after optimization is finished, the volumetric mesh is converted into a surface mesh by removing faces that are inside the volume (only the faces on the surface mesh are retained). In an embodiment, faces in the volumetric mesh associated with learned probability values below a threshold are removed to produce the surface mesh. In an embodiment, the surface mesh is defined by triangular faces. In an embodiment, the 3D model representation is rendered to produce a rendered image and rays corresponding to the rendered image are transported through the 3D model representation to compute probability values for the cells. In an embodiment, the parameters are updated based on the probability values and differences between the rendered image and a reference image of the reference 3D model to reduce the differences.

BRIEF DESCRIPTION OF THE DRAWINGS

The present systems and methods for shape and appearance optimization through topology sampling are described in detail below with reference to the attached drawing figures, wherein.

DETAILED DESCRIPTION

Systems and methods are disclosed related to joint shape and appearance optimization through topology sampling. A 3D model representation comprises a shape and appearance of a particular 3D scene or object from multiple image observations. The 3D model representation is generated by a 3D model generation unit that learns shape and appearance parameters using reference images and a random topology in each training iteration (e.g., step). In an embodiment, multiple randomized topologies are sampled to learn the shape and appearance parameters. The topology is specified by a mask indicating which faces (e.g., triangles, quads, etc.) or cells in a volumetric mesh (e.g., 3D grid, packed tetrahedra) are included in the topology (e.g., visible, enabled, active, covered). Vertex positions of the volumetric mesh are learned to define the shape of the 3D model representation for the topology. Appearance attributes (e.g., spatially varying material attributes such as color, normal vectors, texture, roughness, metalness, etc.) are also learned to define the appearance of the 3D model representation. A surface mesh defined by the volumetric mesh may be rendered using the appearance attributes to produce images. Parameters used by the 3D model generation unit to produce the 3D model representation are updated based on image space losses (e.g., pixel differences) computed between rendered images of the 3D model representation and the reference images of the 3D scene or object.

Figure 1A:
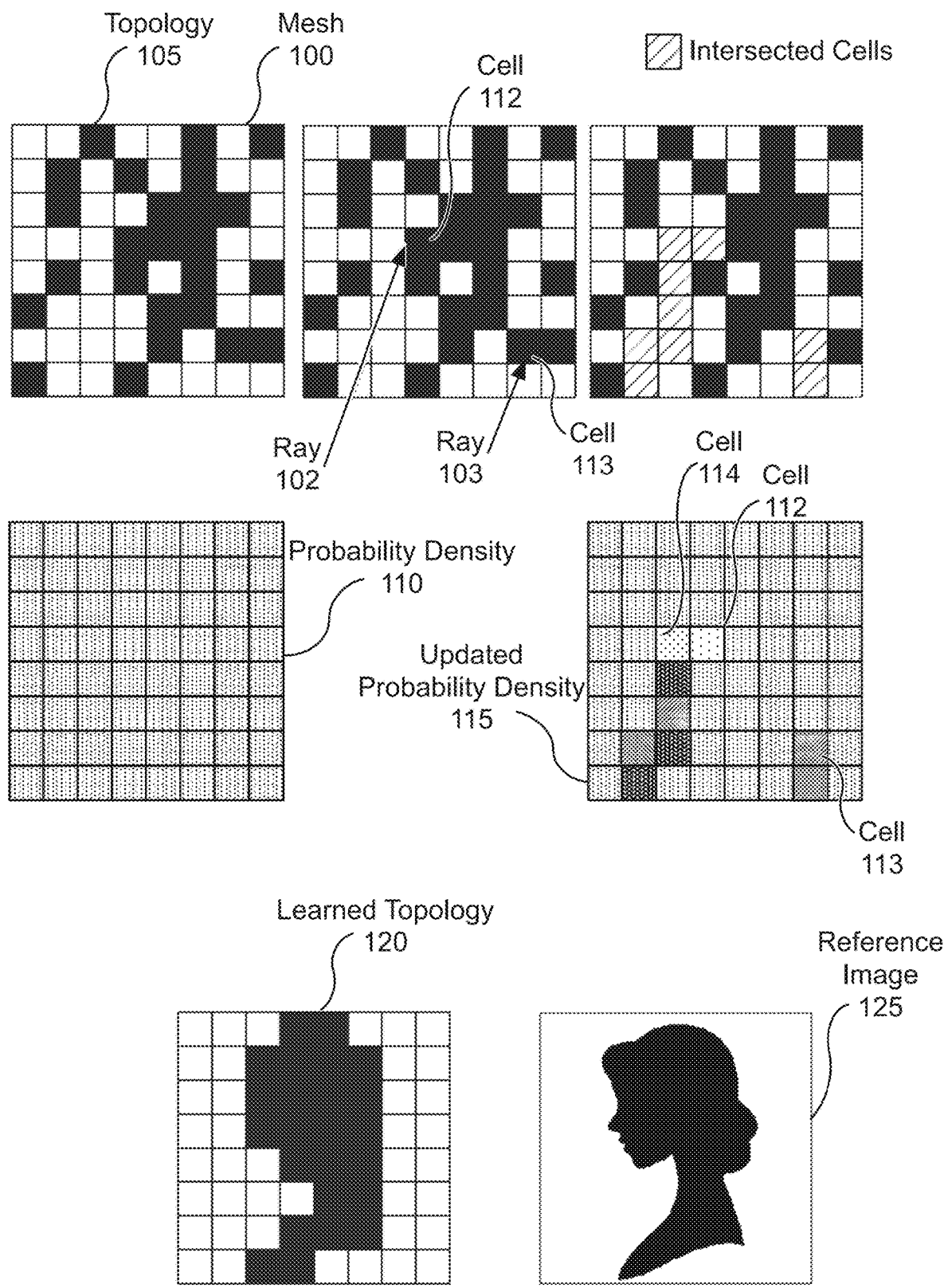
FIG. 1A illustrates a conceptual diagram of a topology and probability data used to learn a topology, in accordance with an embodiment.

FIG. 1A illustrates a conceptual diagram of a topology 105 and probability density 110 and 115 used to learn a topology, in accordance with an embodiment. For purposes of explanation, a 2D example is described instead of a 3D example. A reference image 125 of a 2D object is used to learn the parameters needed to produce a 2D model representation that, when rendered is visually identical or nearly identical compared with the reference image 125.

The topology 105 identifies which cells in a 2D mesh 100 (e.g., grid) are included in the 2D model representation. As shown in FIG. 1A, each cell is a square within a 2D array. In another embodiment, the mesh 100 is a 3D structure, such as an array, and the cells are a 3D geometry, such as a cube, tetrahedra, etc. In an embodiment, the topology 105 may be defined using a single bit for each cell where the bit indicates if the cell is included (enabled) or removed (disabled) from the 2D model representation. For the topology 105, each cell of the mesh 100 that is included is shown as solid black and removed cells of the mesh 100 are shown as solid white. In an embodiment, the topology 105 may be encoded as a "coverage" mask that includes a bit for each cell. In an embodiment, the topology 105 may be defined using a single bit for each face of each cell (e.g., coverage) where the bit indicates if the face is included (enabled) or removed (disabled) from the 2D model representation.

In an embodiment, the topology 105 is randomly generated without relying on any information about the reference image 125 or object being modeled. In an embodiment, a different single topology 105 is used for each training iteration. Once the topology 105 is provided, the 2D model representation is predicted by applying learned parameters to the mesh 100 and the topology 105. The 2D model representation includes vertex positions for the enabled cells and material attributes. The 2D model representation is rendered according to environmental conditions to produce a rendered image. The environmental conditions correspond to the camera position and lighting used to render the reference image 125. When multiple reference images are available, a training iteration may be completed for each reference image using the topology 105 or different topologies.

For each training iteration a loss is computed based on per-pixel image-space differences between each reference image and rendered image. To update the 2D model parameters (e.g., learn the parameters), gradients corresponding to the loss are back propagated (e.g., effectively reversing the calculations), requiring that the renderer be differentiable. Unfortunately, binary values, such as the values encoding the topology 105 are not differentiable. Rather than complicating the topology representation to make it differentiable, a probability density is a continuous function that is computed for the mesh 100 and is differentiable. For example, a probability of a particular cell being included in the model representation can have several values ranging between 0 and 1 inclusive.

The probability values and parameters used to compute the probability values (e.g., positions of the vertices and material parameters) are updated based on the computed loss. In an embodiment, a probability value is associated with each cell of the mesh 100. In another embodiment, a probability value is associated with each face of each cell of the mesh 100. The probability values in the probability density 110 may be initialized to predetermined or random values that are updated for each training iteration. As shown in FIG. 1A, each probability value is associated with a cell (or a face) and is initialized to 0.5, where a lower probability value (darker) indicates that the cell is less likely to be active in the learned topology and a higher probability value (lighter) indicates that the cell is more likely to be active in the learned topology.

Rays are traced within the 2D plane of the mesh 100 for each pixel of the rendered image to compute per-pixel probability values. When the mesh 100 is a 3D mesh, the rays are traced in 3D and are not limited to the 2D plane. As shown in FIG. 1A, a first ray 102 intersects several uncovered cells before intersecting a covered cell 112. Intersected cells are shown in a diagonal pattern. A second ray 103 intersects one uncovered cell before intersecting a covered cell 113. Because the mesh 100 is opaque, the rays terminate when a covered cell is intersected or if the ray passes through the entire mesh 100 without intersecting a covered cell. In an embodiment, cell intersections are retained for updating the probability values during backpropagation. In an embodiment, instead of retaining the cell intersections, the rays are retraced to update the probability values during backpropagation.

The rendered image is compared with the reference image 125 to compute per-pixel differences. For each pixel, the difference is multiplied by the probability value corresponding to the pixel to produce products. The products are used to compute an image-level loss. As training progresses and the probability values are updated to reduce the losses, pixels having higher probability values contribute more to the image-level loss compared with pixels having lower probability values. An updated probability density 115 after at least one training iteration shows that the intersected cells are updated to reduce the loss. Specifically, the probability values of cell 112 and 114 which correspond to cells that are within the object in the reference image are increased and the probability values of intersected cells that are not within the object are decreased. After several training iterations, the updated probability density 115 will converge to equal a learned topology 120 after optimization. In the learned topology 120 a covered (or active) cell is indicated as black and an empty cell is indicated as white. The learned topology 120 also represents a learned topology. Increasing a resolution of the mesh 100 will result in a learned topology 120 that more closely replicates the fine silhouette details of the object in the reference image 125.

Even when the training relies on a single topology, such as the topology 105 for training, when multiple reference images are used, the probability values for cells that are not covered according to the topology 105 will increase and the probability values for cells that are covered according to the topology 105 will decrease as the loss computed for each of the multiple reference images is backpropagated to update the probability density corresponding to the mesh 100. Additionally, positions vertices of the cells that are covered according to the topology 105 will change as the training progresses to converge and approximate the shape of the object in the reference image 125. The cells that are enabled according to the topology 105 are effectively deformed, so that a rendered image of the 3D model representation produced for the mesh 100 and topology 105 matches the reference image 125. Similarly, the material attributes of the 3D model representation also evolve over multiple training iterations.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
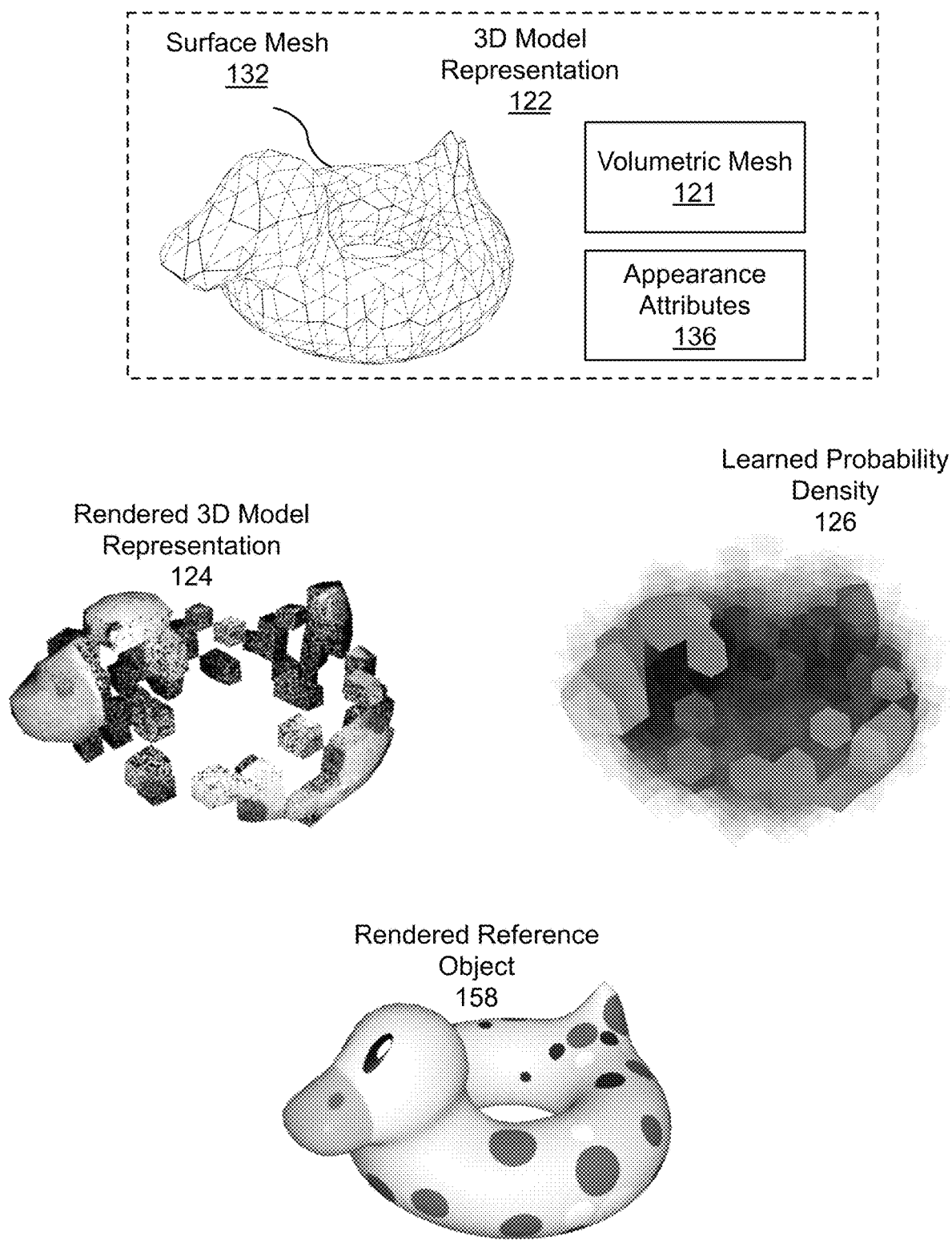
FIG. 1B illustrates a conceptual diagram of a 3D model representation, learned probability density, rendered 3D model representation, and a rendered reference object, in accordance with an embodiment.

FIG. 1B illustrates a conceptual diagram of a 3D model representation 122, learned probability density 126, rendered 3D model representation 124, and a rendered reference object 158, in accordance with an embodiment. The 3D model representation 122 defines the shape and appearance of a particular 3D scene or object from multiple image observations. Vertex positions of a volumetric mesh 121 (e.g., dense 3D grid) are deformed to define the shape of the 3D model representation 122 for at least one topology. The topology controls which faces and/or cells of the volumetric mesh 121 are visible (e.g., active) and may be selected at random or based on the probability density that is learned so far. The volumetric mesh 121 may be initialized as a uniform 3D grid and is learned during training. A surface mesh 132 may be extracted from the volumetric mesh 121. A shape of the surface mesh 132 is learned that closely matches a shape of the rendered reference object 158. Appearance attributes 136 (e.g., spatially varying material parameters) are also learned to define the appearance of the 3D model representation 122. The 3D model representation 146 effectively comprises a learned volumetric mesh 121, a learned surface mesh 132, and learned appearance attributes 136.

The 3D model representation 122 is rendered by a differentiable renderer to produce rendered images corresponding to the reference images. As shown in FIG. 1B, early in the training process, a rendered 3D model representation 124 does not closely approximate the rendered reference object 158. Only a subset of the cell faces in the volumetric mesh 121 are visible according to the topologies used to learn the 3D model representation 122 that is rendered to produce the rendered 3D model representation 124, so important portions of the object are missing or unknown. For example, 500 training iterations may have been performed to produce a volumetric mesh 121 associated with the rendered 3D model representation 124 and learned probability density 126.

The volumetric mesh 121 is rendered by a probability renderer according to the topologies to produce the learned probability density 126. For example, the probability values that are computed for each visible cell represent the probability that a ray intersects the cell and each ray is traced until a cell in the volumetric mesh 121 that is included in the topology (e.g., active cell) is intersected (or the ray passes through the entire topology). In other words, the topology and resulting learned surface mesh 132 are opaque and tracing terminates at the first intersection.

The probability density 126 comprises probability values for each face or cell in the volumetric mesh. Lighter colors correspond to higher probability values and darker colors correspond to lower probability values. Higher probability values correspond to a higher likelihood that the cell of the volumetric mesh 121 is included in the 3D model representation. Therefore, in an embodiment, faces or cells associated with a probability value of zero (or below a minimum threshold value) may be removed from the 3D model representation 122. In an embodiment, faces and/or cells can be removed from the 3D model representation 122, but new faces and/or cells cannot be inserted or added into the 3D model representation 122. The cell or face based probability density values may be converted into pixel probability values for the image space loss computation.

An image space loss is calculated based on the learned probability density 126 and per-pixel differences between the rendered 3D model representation 124 and the rendered reference object 158. The image space loss is backpropagated through the differentiable renderer, the probability renderer, and the 3D model generation unit that predicts the 3D model representation 122 to update learned parameters used by the probability renderer and the 3D model generation unit.

Figure 1C:
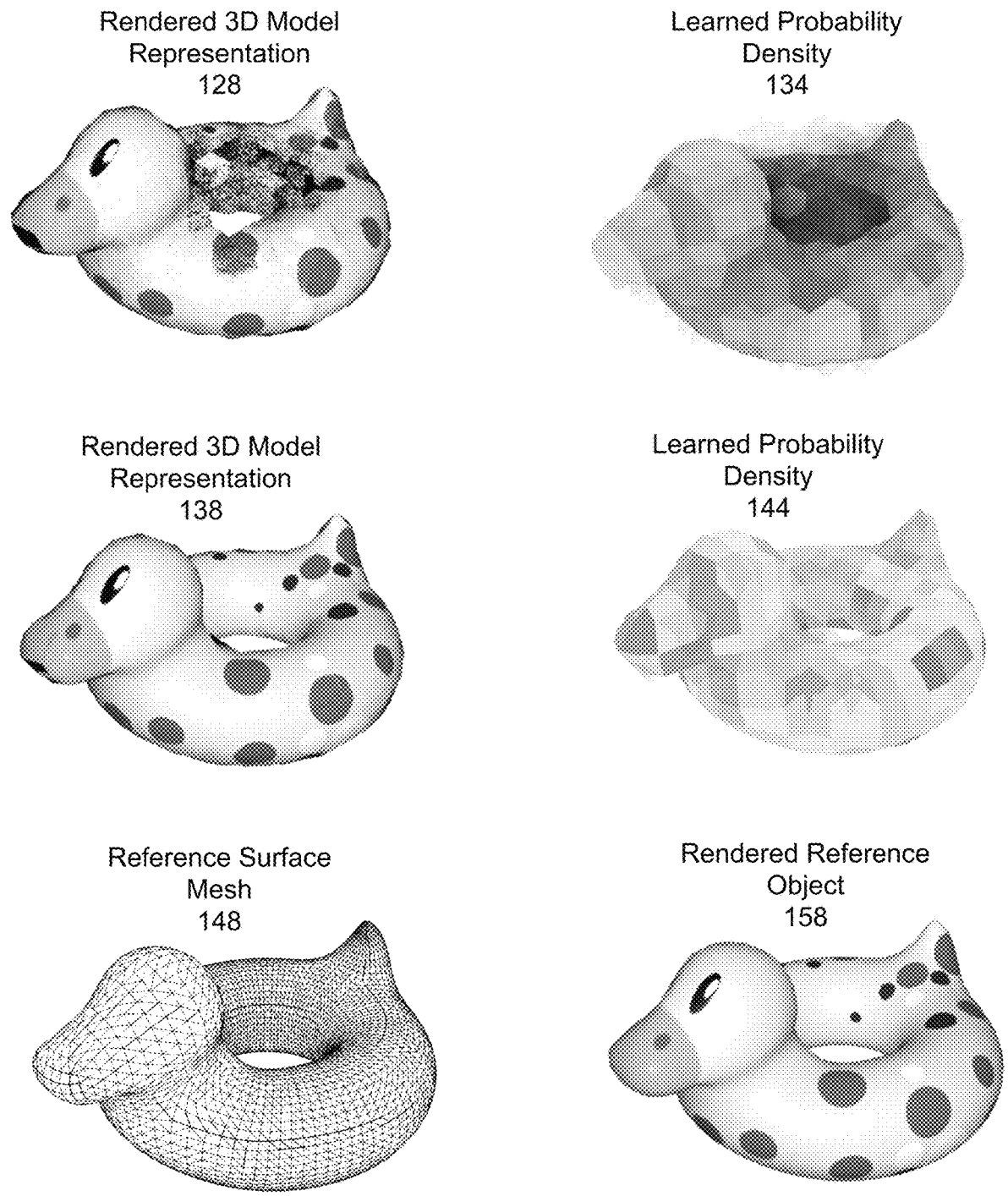
FIG. 1C illustrates a conceptual diagram of learned probability densities, rendered 3D model representations, and a learned surface mesh, in accordance with an embodiment.

FIG. 1C illustrates a conceptual diagram of learned probability densities 134 and 144, rendered 3D model representations 128 and 138, a reference surface mesh 148, and a rendered reference object 158, in accordance with an embodiment. Compared with the volumetric mesh 121 associated with the rendered 3D model representation and learned probability density 126 shown in FIG. 1B, 1000 training iterations have been performed to produce the volumetric mesh 121 associated with the rendered 3D model representation 128 and learned probability density 134. 2000 training iterations have been performed to produce the volumetric mesh 121 associated with the rendered 3D model representation 138 and learned probability density 144. Compared with the reference surface mesh 148 and the rendered reference object 158, the surface mesh 132 and rendered 3D model representation 138, respectively, accurately represent the shape and appearance of the object. As the probability values in the learned probability densities 126, 134, and 144 are updated, the more accurate values increase (lighten) and the less accurate values (darker) are removed.

Figure 1D:
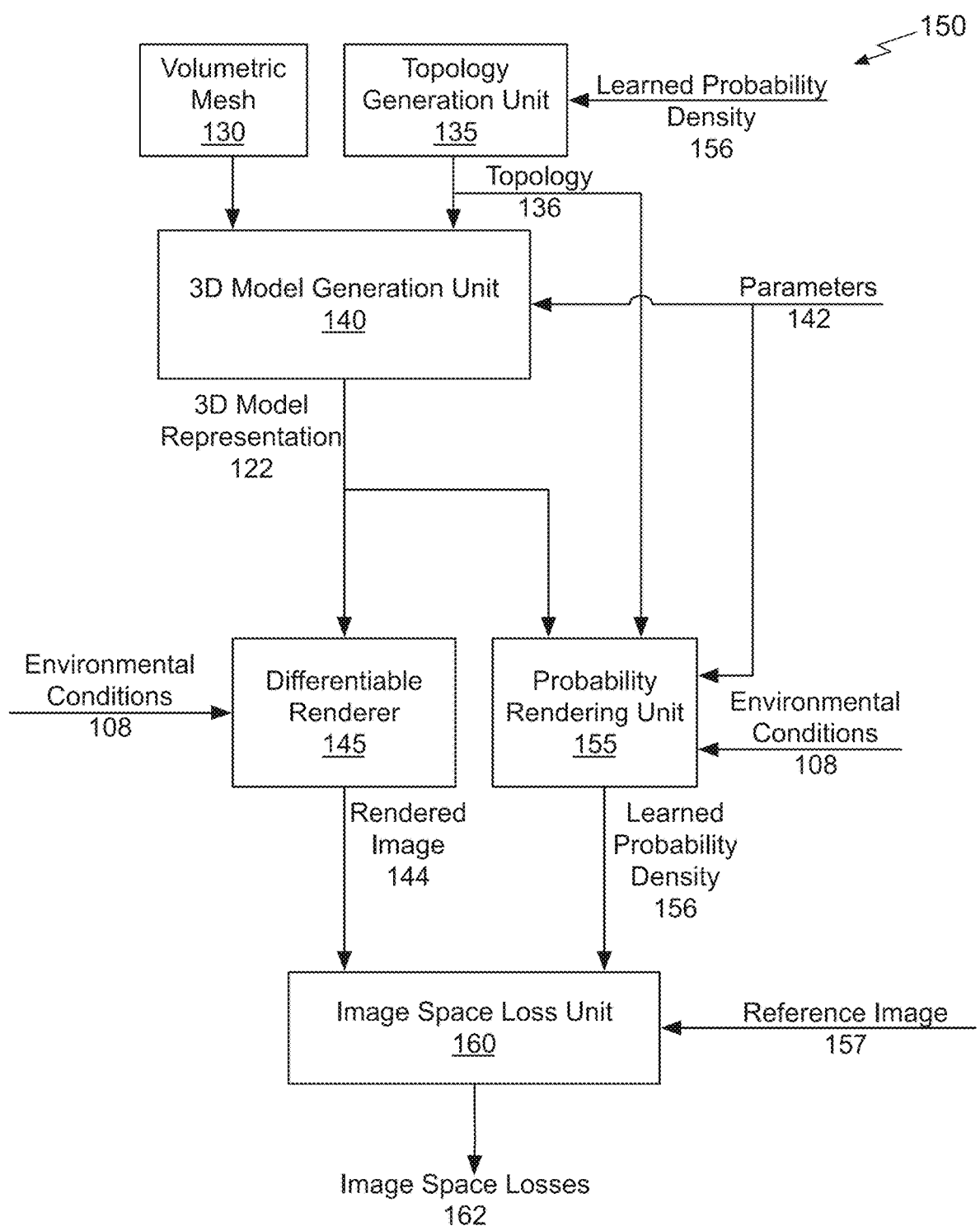
FIG. 1D illustrates a conceptual diagram of a shape and appearance driven automatic 3D modeling system, in accordance with an embodiment.

FIG. 1D illustrates a shape and appearance driven 3D modeling system 150, in accordance with an embodiment. The system 150 includes a 3D model generation unit 140 that receives a volumetric mesh 130 and topology 136 that are processed according to learned parameters 142 to produce the 3D model representation 122. In an embodiment, the 3D model generation unit 140 is a neural network model. The 3D model representation 122 includes a 3D surface mesh and appearance attributes for an object or scene. In an embodiment, the 3D model generation unit 140 extracts a surface triangle mesh from the volumetric mesh 130.

The volumetric mesh 130 comprises a dense array of geometric cells, where each cell is defined by locations of vertices in 3D space that form a volume (e.g., cube, tetrahedra, or other geometric shape). In an embodiment, the volumetric mesh 130 is defined by other types of primitives or representations. In an embodiment, the initial volumetric mesh 130 is a uniform grid of cubes or tetrahedra. Through training, locations of the vertices are adjusted and one or more of the vertices, cell faces, and/or cells may be removed as the 3D model representation 122 is learned. The volumetric mesh 130 may be subdivided as the training progresses to refine the 3D model representation 122.

A topology generation unit 135 provides the topology 136 definition indicating visibility or coverage of faces and/or cells in the volumetric mesh 130. In an embodiment, one or more topologies used during training are Monte Carlo sampled topologies. In an embodiment, the learned probability density 156 is also used to generate one or more topologies via importance sampling.

The 3D model representation 122 comprises learned positions of the vertices in the volumetric mesh 130, a surface mesh corresponding to the volumetric mesh 130, and appearance attributes 136. The appearance attributes may include normal vector maps, materials, texture maps, skinning weights, roughness, metalness, and the like. More specifically, the texture maps may define lighting and material properties. An initial surface texture for the initial 3D model representation 122 may be a constant or randomized color and the colors of each texel in the initial surface texture are adjusted based on image space differences to produce a texture for the 3D model representation 122.

Environmental conditions 108 define camera and light positions for each reference image 154 and that are used by a differential renderer 145 for producing each rendered image 144. The differential renderer 145 renders the 3D model representation 122 according to the environmental conditions 108 to produce the rendered image 144. Specifically, the differential renderer 145 renders the surface mesh corresponding to the volumetric mesh 130 and the appearance attributes. Each reference image 154 is generated by rendering a reference 3D model according to the environmental conditions 108. While a shape of the initial volumetric mesh 130 may not closely resemble a shape of reference 3D model, after successful optimization, the shape of the learned volumetric mesh does closely resemble the shape of the reference 3D model.

In an embodiment, one or more operations of the differentiable renderer 145 are performed using any combination of a graphics processing unit (GPU) graphics pipeline, GPU general computation cores, or on a central processing unit (CPU). The differentiable renderer 145 enables operations such as rasterizing large numbers of triangles, attribute interpolation, filtered texture lookups, as well as user-programmable shading and geometry processing, all in a range of resolutions. In contrast with conventional rendering pipelines, the operations performed by the differentiable renderer 145 are differentiable and image space losses 162 may be propagated backwards through the differentiable renderer 145 to iteratively adjust the 3D model representation 122. In some embodiments, rendering operations may include rasterization, ray tracing, and path tracing.

A probability rendering unit 155 computes per cell or per face probability values based on the environmental conditions 108, topology 136, and predicted or learned volumetric (3D) mesh portion of the 3D model representation 122. Rays are marched through the volumetric mesh 130 and terminated at the first intersection with a cell (or face) that is covered according to the topology (or at the scene background if no covered cell intersection occurs). In the context of the following description, the tracing or marching of rays through the 3D mesh is referred to as transporting.

An image space loss unit 160 processes each reference image 157 and each corresponding rendered image 144 to produce the image space losses 162. The image space losses 162 are backpropagated through the differentiable renderer 145, the probability rendering unit 155, and the 3D model generation unit 140 to reduce the differences between the reference image 157 and rendered image 144. Backpropagation provides updates to the parameters 142 for the probability rendering unit 155 and the 3D model generation unit 140. The parameters may be updated for each rendered image 144 and corresponding reference image 157. In an embodiment, a single topology may be used to render multiple rendered images 144 that are each associated with different environmental conditions 108. In an embodiment, multiple topologies may be used to render multiple rendered images 144 for the same environmental conditions 108.

Learning success is measured according to whether rendered images 144 are visually identical or nearly identical compared with the reference images 157. In other words, the rendered and reference images are used to determine and fine-tune the geometry that defines the 3D model representation 122 and there is no need to directly compare the 3D model representation 122 with a reference 3D model. In fact, the representation of the reference 3D model may be quite different compared with the representation of the 3D model representation 122. As the only signals driving the optimization are differences in the rendered and reference images, the approach is highly general and versatile: it easily supports many different forward rendering models such as normal mapping, spatially-varying bi-directional reflectance distribution functions (BRDFs), displacement mapping, and the like. Supervision through images only is also key to the ability to easily convert between rendering systems and scene representations.

In an embodiment, the generated 3D model representations 122 comprise triangle meshes with materials encoded as textures to ensure that the 3D model representations 122 render efficiently on modern graphics hardware and benefit from, e.g., hardware-accelerated rasterization, ray-tracing, and filtered texture lookups. The automatically generated 3D model representations 122 may be used for optimized level-of-detail generation to reduce aliasing, seamless mesh filtering, approximations of aggregate geometry, joint optimization of shape and skinning weights to produce reduced geometry for animation, conversion between shape representations, and conversion between rendering systems.

Prior art techniques rely on training using all possible topologies. In contrast, a single topology 136 per training step (iteration of loss computation, backpropagation, and updating of parameters 142) may be used to learn the 3D model representation 122. A reference image 157 is used per training step or multiple reference images 157 may be used per training step. In each training step, the single topology 136 enables a subset of the faces from the volumetric mesh 130 to create an opaque surface mesh that is rendered. If the entire volumetric mesh 130 is visible, only the outside of the volumetric mesh 130 would be intersected and the rays would not penetrate into the interior. Enabling a subset of the faces, particularly subsets that enable different combinations of the faces also produces more accurate and smooth silhouette edges.

Prior art techniques do not use an opaque volumetric mesh 130, so that rays do not terminate at the first intersection and silhouette edges appear smooth as a result of varying levels of transparency of the mesh. These prior art techniques are expensive to implement in terms of execution time and/or geometric accuracy (due to converting the mesh from transparent to opaque once training is complete). Additionally, prior art techniques typically rely on an initial volumetric mesh or 3D model (cube, sphere, etc.) input that is determined based at least in part on the reference images (or reference 3D model). In contrast, the same initial volumetric mesh 130 may be used to learn any 3D model representation 122.

Figure 1E:
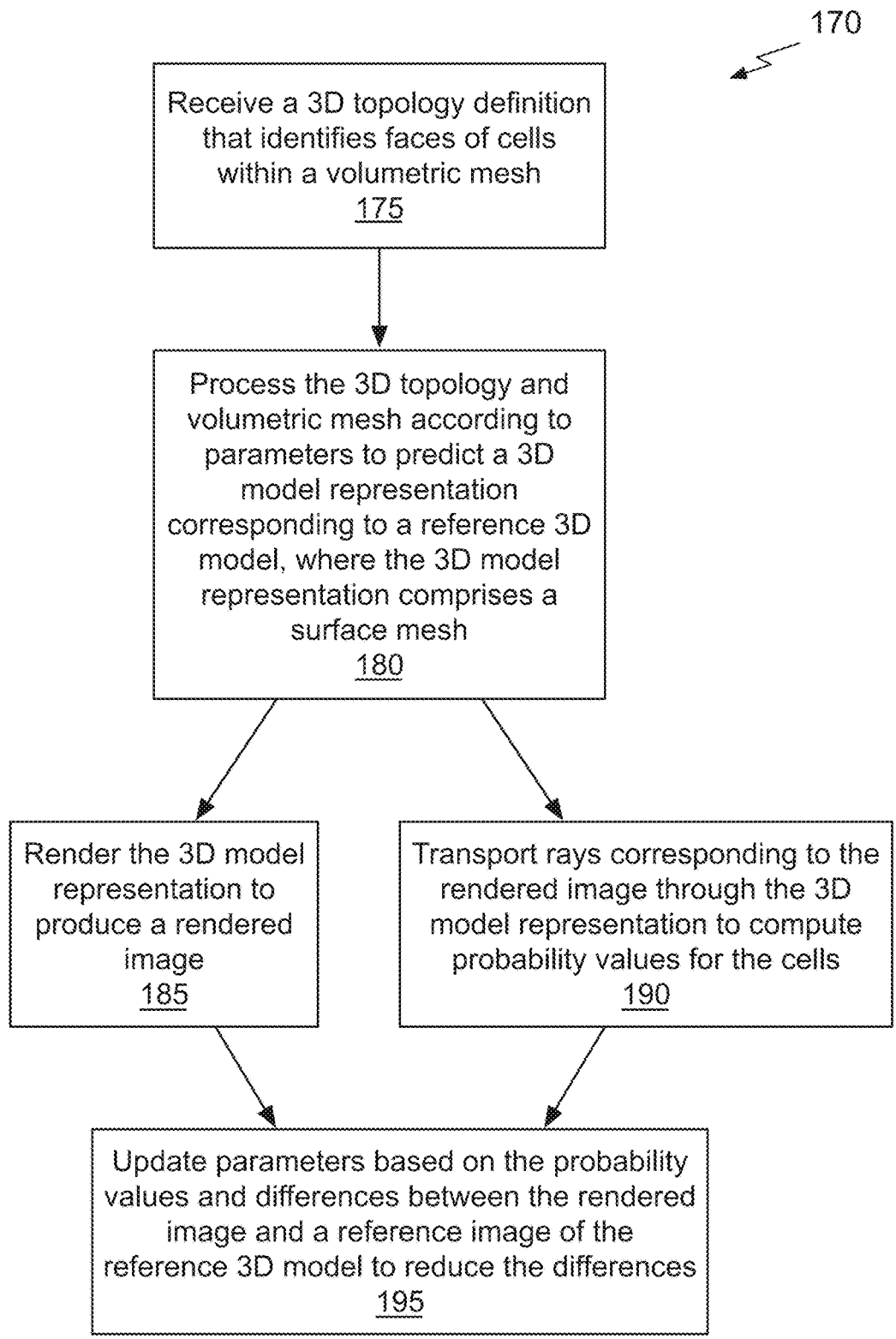
FIG. 1E illustrates a flowchart of a method for shape and appearance driven automatic 3D modeling suitable for use in implementing some embodiments of the present disclosure.

FIG. 1E illustrates a flowchart of a method 170 for shape and appearance driven automatic 3D modeling suitable for use in implementing some embodiments of the present disclosure. Each block of method 170, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 170 is described, by way of example, with respect to the shape and appearance driven 3D modeling system 150 of FIG. 1D. However, this method may additionally or alternatively be executed by any one system, or any combination of systems, including, but not limited to, those described herein. Furthermore, persons of ordinary skill in the art will understand that any system that performs method 170 is within the scope and spirit of embodiments of the present disclosure.

At step 175, a 3D topology definition that identifies faces of cells within a volumetric mesh is received. In an embodiment, the 3D topology definition is the topology 136 and the volumetric mesh is the volumetric mesh 130. In an embodiment, the volumetric mesh is opaque. In an embodiment, the volumetric mesh is initialized as a uniform 3D grid. In an embodiment, the volumetric mesh is a dense volumetric mesh. In an embodiment, the topology definition is a multi-bit visibility mask that includes a single bit for each face of the cells within the volumetric mesh. In an embodiment, the topology definition is a multi-bit visibility mask that includes a single bit for each cell within the volumetric mesh and the single bit is shared between the faces of the cell. The single bit may be asserted when the face or cell is visible and negated when the face or cell is not visible.

At step 180, the 3D topology and volumetric mesh are processed according to parameters to predict a 3D model representation corresponding to a reference 3D model, where the 3D model representation comprises a surface mesh defined by vertex positions of the cells and connections between the vertex positions (e.g., vertices). In an embodiment, the surface mesh is opaque. In an embodiment, the faces of the surface mesh are triangles. In an embodiment, the 3D model representation comprises spatially varying material attributes (e.g., color, texture, normal vectors, roughness, metalness, etc.). In an embodiment, the 3D topology and volumetric mesh are processed by the 3D model generation unit 140.

At step 185, the 3D model representation is rendered to produce a rendered image. In an embodiment, a differentiable renderer, such as the differentiable renderer 145 produces the rendered image. In an embodiment, only faces or cells within the volumetric mesh that are visible, according to the topology, are rendered. In an embodiment, steps 185 and 190 are performed in parallel. In an embodiment, the 3D model representation comprising an opaque surface mesh is directly optimized, instead of optimizing a volumetric or semi-transparent representation.

At step 190, rays corresponding to the rendered image are transported through the 3D model representation to compute probability values for the cells. In an embodiment, the same environmental conditions (e.g., camera position, light position(s), etc.) used to produce a reference image of the reference 3D model are used to render the rendered image and to compute the probability values. In an embodiment, a ray is transported through the 3D model representation for each pixel in the rendered image.

In an embodiment, probability values are computed for each face of a cell. In an embodiment, a probability value is computed for each cell and is shared for all faces of the cell. In an embodiment, the 3D model representation includes a predicted volumetric mesh that is processed along with the 3D topology to update probability values for each face or cell that is intersected by a ray. In an embodiment, the volumetric mesh is initialized as a uniform grid and a structure of the volumetric mesh (cell face vertex positions and connections) is modified for each training iteration to better approximate a reference object or scene. In an embodiment, transport of a ray terminates when a cell or face is intersected that is visible, according to the topology. In an embodiment, the probability values are computed by the probability rendering unit 155.

At step 195, the parameters are updated based on the probability values and differences between the rendered image and a reference image of the reference 3D model, to reduce the differences. In an embodiment, the differences are propagated backwards through the differentiable renderer 145 to update the parameters. In an embodiment, updating the parameters comprises computing a pixel probability value for each pixel in the rendered image using the probability values, scaling the difference for each pixel by the probability value for the pixel to compute products, and summing the products to generate an image loss.

The steps 175, 180, 185, 190, and 195 comprise a training iteration and may be repeated multiple times for additional 3D topology definitions. In an embodiment, the 3D topology definition and the additional 3D topology definitions are randomly generated for each training iteration. In an embodiment, at least a portion of the 3D topology definition and the additional 3D topology definitions are Monte Carlo sampled topologies. In an embodiment, at least one of the additional 3D topology definitions is determined based on the probability values. In an embodiment, the volumetric mesh is subdivided for at least one of the additional 3D topology definitions.

In an embodiment, a single 3D topology definition is used for multiple training iterations where additional images associated with different camera positions or light positions are rendered, additional rays corresponding to the additional rendered images are transported through the 3D model representation to compute additional probability values for the cells, and the parameters are updated for each training iteration. The parameters are updated based on the additional probability values and additional differences between the additional rendered images and additional reference images of the reference 3D model that correspond to the different camera positions or light positions to reduce the additional differences.

Details of the algorithms are described in the following paragraphs. Through the training, visual differences are reduced between a reference rendering $y_i$, compared to a rendering $x_i$ of a predicted 3D model representation with unknown topology and a set of learned attributes, $\theta$ (e.g., vertex positions and spatially varying material attributes). Let T denote a topology chosen from a discrete set of topologies $T \in \mathcal{T}$. The 3D model representation is optimized over multiple image observations, i, by minimizing an objective function, typically, the $l_2$ norm between pixel values, j, in image space, between the rendered images:

$$\operatorname*{argmin}_{T,\theta} \sum_i \sum_j |x_{ij}(T, \theta) - y_{ij}|_2, \qquad \text{Eq. (1)}$$

i.e., joint optimization of topology, T, and the parameters, $\theta$. The 3D model representation is rendered using a differentiable renderer, R, so $x_i = R(T, \theta, v_i)$, where $v_i$ represents the environmental conditions for view i, e.g., camera parameters and lighting.

To enable gradient-based optimization over discrete topologies, the expectation of the loss over a distribution over topologies is used as an optimization target:

$$\operatorname*{argmin}_{\theta,p} \sum_i E_{p(T|\phi)}\left[\sum_j |x_{ij}(T, \theta) - y_{ij}|_2\right] = \operatorname*{argmin}_{\theta,p} \sum_i \Sigma_{T \in \mathcal{T}} p(T|\phi) \sum_j |x_{ij}(T, \theta) - y_{ij}|_2 \qquad \text{Eq. (2)}$$

where $p(T|\theta)$ is the probability of topology T. In contrast with prior art solutions which use a loss based on distances between meshes in 3D, the loss function may be expressed in image space, which enables optimization from image observations, without knowledge of the reference 3D mesh.

Through early termination of the ray transport, linear complexity may be achieved in terms of how many of m faces a ray intersect. However, it is often impractical to evaluate a unique set of topologies for each ray. A constant topology can be used for each training iteration by uniformly sampling the topologies and training the 3D model generation unit 140 and the probability rendering unit 155 using an unbiased Monte Carlo estimate of $E_{p(T|\phi)}[\Sigma_j |x_{ij}(T) - y_{ij}|_2]$.

Let $T \sim \mathcal{U}(\mathcal{T})$ denote uniform sampling of topologies from the set T of all topologies for a given mesh, then a Monte Carlo estimate with M samples is:

$$E_{p(T|\phi)}\left[\sum_j |x_{ij}(T) - y_{ij}|_2\right] \approx \frac{|\mathcal{T}|}{M} \Sigma_{T \sim \mathcal{U}(\mathcal{T})}^M \left[\sum_j p_j^{ray}(T|\phi)|x_{ij}(T) - y_{ij}|_2\right] \qquad \text{Eq. (3)}$$

Going further, the normalization constant $$\frac{|\mathcal{T}|}{M}$$

is omitted as it does not affect the minimization task.

Returning to the original optimization task in Equation 2, reintroducing the sum over training examples, and substituting the Monte Carlo estimate from Equation 3, produces $$\operatorname*{argmin}_{\theta,p} \sum_i \sum_{T} p(T|\theta) \sum_j |x_{ij}(T, \theta) - y_{ij}|_2 \approx \qquad \text{Eq. (4)}$$

$$\operatorname*{argmin}_{\theta,\phi} \sum_i \sum_{i=1}^N \sum_j p_j^{ray}(T|\phi, \theta)|x_{ij}(T, \theta) - y_{ij}|_2 \approx$$

-continued $$\underset{\theta,p}{\operatorname{argmin}} \sum\nolimits_{k,T_i \sim \mathcal{U}(\mathcal{T})} \sum\nolimits_j p_j^{ray}(T_i \mid \phi, \theta) |x_{ij}(T_i, \theta) - y_{ij}|_2.$$

Notice that in the last line, the terms of the nested sums can be evaluated in any order. This means that a topology $T_i$ can be randomly sampled per training iteration and a Monte Carlo estimation may be viewed as adding additional training examples. The result is a practical and simple optimization procedure: in each training iteration, randomly sample a single topology, render an image with the single topology, and weight the image loss by the probability. In contrast, prior art techniques, such as a deep marching cubes described by Liao et al. in "Deep Marching Cubes: Learning Explicit Surface Representations," CVPR 2018, evaluate all topologies in each training step.

The final objective function in Equation 4 leads to a simple training algorithm, outlined in TABLE 1. In each training step, a random topology is selected, an image is rendered using the mesh induced by that topology, the ray probabilities are computed, and the loss is updated. Gradients of the loss are used to update the face probabilities and other optimization parameters used to compute the vertex positions and appearance attributes.

TABLE 1

ALGORITHM 1: Training loop (forward pass).

```
Input: Scene s, reference images y
1 for i ∈ trainingExamples do
2     loss ← 0;
3     t ← randomBitVector( ) ;       // Generate a random topology
4     mesh ← generateMesh(s, t) ;    // Generate mesh from topology
5     x_i ← renderColor(s, mesh);
6     for j ∈ pixels do
7         r ← cameraRay(s, f);
8         p_j^ray ← rayProbability(r, s, t, φ);
9         loss ← loss + p_j^ray |x_ij - y_ij|_2
```

A key insight is that the computation of the pixel colors $x_{ij}$ and ray probabilities, $p_j^{ray}$, can be decoupled. This simple observation has powerful practical consequences: the full machinery of differentiable rendering on triangle meshes may be reused, while jointly learning topology. Hence, any off-the-shelf differentiable renderer may be employed to compute the pixel colors.

To compute the ray probabilities, a simple ray marcher may be used as outlined in FIG. 2A and TABLE 2 below. The accumulation of face probabilities, $\phi_k$, resembles alpha compositing of semi-transparent triangles, but with the important distinction that the rays are terminated at the first opaque intersection visible according to the topology. Differentiable rasterization is used to render color images using renderColor shown in TABLE 1, and therefore the topology may be constant per training example. It is not a strict requirement for the topology to be constant for an entire training example. For example, in an embodiment, differentiable ray tracing may be used to update the topology for each ray. However, using a single topology per rendered image does result in fast convergence, so adding complexity and computations required to vary the topology on a per ray basis may not be beneficial in terms of accuracy or speed for 3D model construction. The shape and appearance may be jointly optimized with the topology. However, care should be taken when optimizing vertex positions, which influence both ray probabilities and pixel colors. In an embodiment, dynamic vertex positions may be handled by updating a bounding volume hierarchy between each training iteration.

Figure 2A:
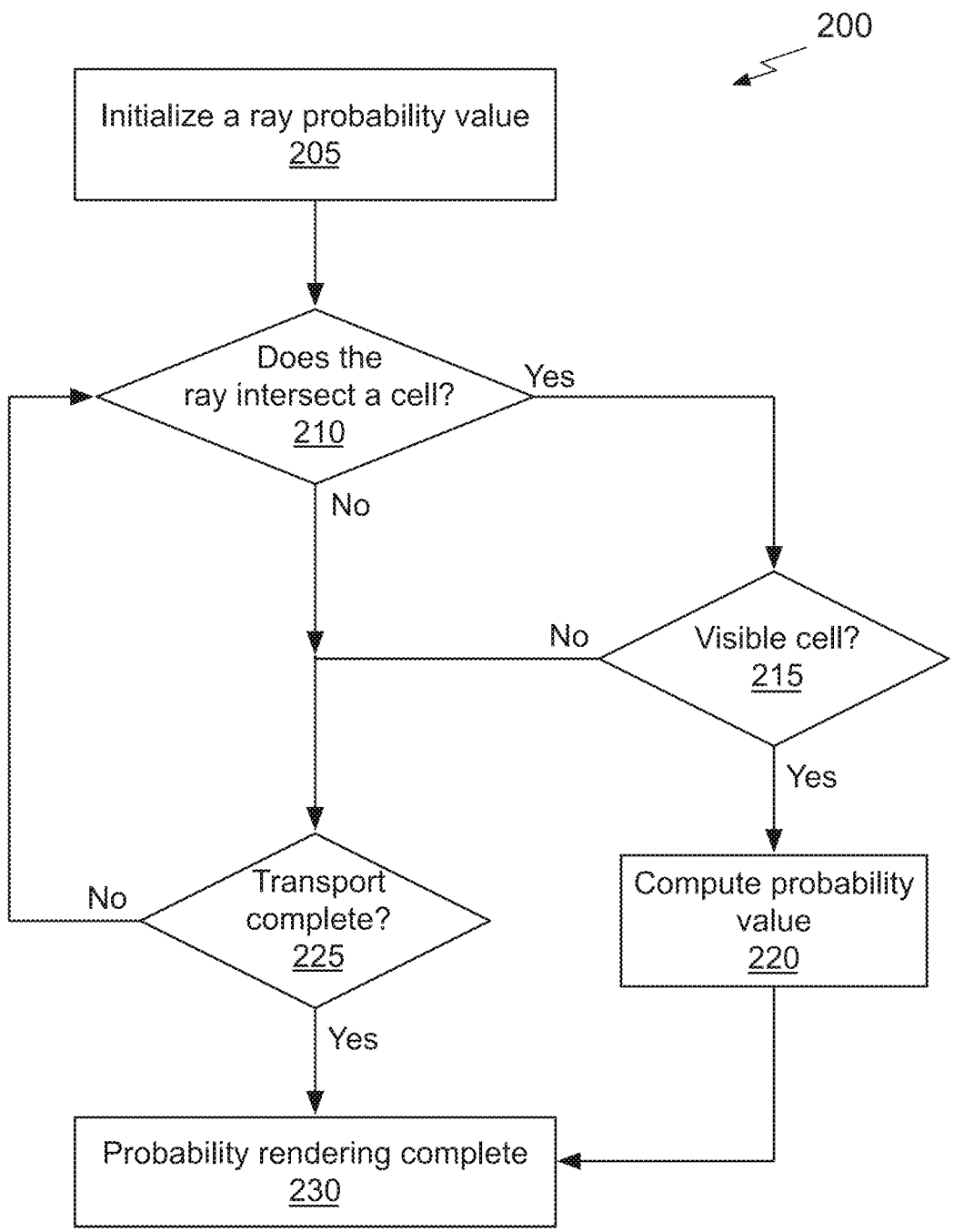
FIG. 2A illustrates a flowchart of a method for rendering probability values for a sampled topology suitable for use in implementing some embodiments of the present disclosure.

FIG. 2A illustrates a flowchart of a method 200 for rendering probability values for a sampled topology suitable for use in implementing some embodiments of the present disclosure. The method 200 may be used to perform line 8 of the algorithm shown in TABLE 1. The method 200 may be performed for each pixel that is rendered in the reference image and/or the rendered image. At step 205, a ray probability value initialized. The ray probability value may be initialized to a random value or to a predetermined value.

In the following description of the method 200, intersections between a ray and one or more cells are described. In another embodiment, intersections may be identified between a ray and specific faces of the one or more cells. At step 210, the probability rendering unit 155 determines if a cell in the volumetric mesh 130 is intersected by the ray, and, if so at step 215, the probability rendering unit 155 then determines if the intersected cell is visible according to the topology 136. If the intersected cell is not visible, then the probability rendering unit 155 proceeds to step 225. Otherwise, at step 220, the probability rendering unit 155 computes a probability value for the intersected and visible cell. Once a visible cell is intersected by the ray, the transport of the ray is complete and terminates, and, at step 230 the probability rendering unit 155 completes the probability rendering for the ray.

If, at step 215 the probability rendering unit 155 determines that the intersected cell is not visible according to the topology, then at step 225, the probability rendering unit 155 determines if transport of the ray is complete. Transport of the ray is complete when the ray has passed through the entire volumetric mesh 130 without intersecting a visible cell. When transport is complete, the probability rendering unit 155 completes the probability rendering for the ray at step 230. If transport is not complete at step 225, then the probability rendering unit 155 returns to step 210 to determine if the ray intersects another cell in the volumetric mesh 130.

In an embodiment, the probability values for each ray are computed using algorithm 2 shown in TABLE 2. Each ray is associated with a particular pixel.

TABLE 2

ALGORITHM 2: The probability $p^{ray}$ is obtainted by ray marching through a topology t.

```
1 Function rayProbability(Ray r, Scene s, Topology t, Prob. φ):
2     p^ray ← 1;
3     repeat
4         k ← s.nextIntersection(r);
5         if k ≠ 0 then              // Test valid intersection
6             p^ray ← p^ray φ_k^{t_k} (1 - φ_k)^{1-t_k} ;
7     until t_k ≠ 0 or k = 0;
8     return p^ray
```

Once all of probability values are computed and the rendered image 144 is rendered, the image space loss unit 160 may compute the image space losses 162.

Figure 2B:
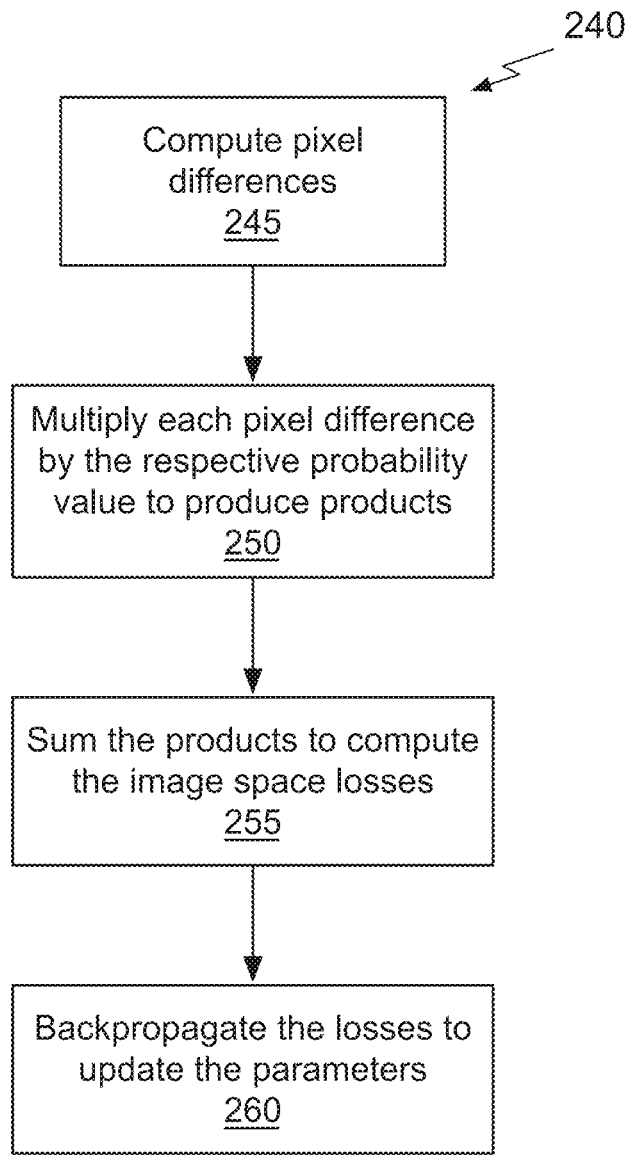
FIG. 2B illustrates a flowchart of a method for updating parameters based on probability values an image space differences suitable for use in implementing some embodiments of the present disclosure.

FIG. 2B illustrates a flowchart of a method 240 for updating parameters based on probability values an image space differences suitable for use in implementing some embodiments of the present disclosure. At step 245, the image space loss unit 160 computes pixel differences for corresponding pixels in the rendered image 144 and the reference image 154. At step 250, the image space loss unit 160 multiples each pixel difference by the respective probability value to produce products. At step 255, the image space loss unit 160 sums the products to compute the image space losses 162. At step 260, the image space loss unit 160 backpropagates the image space losses 162 to update the parameters 142.

In an embodiment, a backward pass of the ray-marcher algorithm shown in TABLE 2 provides gradients for the ray probabilities w.r.t. the face probabilities $\phi_k$. Let $\mathcal{B}$ denote the set of faces intersected by the ray before the first hit (at face h) in the topology 136. The probability of a ray, $p_j^{ray}$ up to and including the first hit is $$p_j^{ray}(T|\phi) = \Pi_{k \in B}(1-\phi_k)\phi_h.$$  Eq. (5)

From equation (5), the partial derivatives are given by:

$$\frac{\partial p_j^{ray}}{\partial \phi_k} = \frac{-p_j^{ray}}{(1-\phi_k)}, \forall k \in \mathcal{B} \quad \frac{\partial p_j^{ray}}{\partial \phi_h} = \frac{p_j^{ray}}{\phi_h}.$$  Eq. (6)

When optimizing vertex positions, the partial derivatives $$\partial p_j^{ray}/\partial v_k$$

are needed, where $v_k$ is the position of vertex k. Note that moving a vertex position changes visibility and introduces discontinuities. These visibility gradients should be carefully handled, which is a highly active research topic with many proposed solutions. In an embodiment, visibility gradients may be approximated based on rasterization of the 3D model representation 122 through screen-space anti-aliasing. The same screen-space anti-aliasing technique may be applied to the ray probabilities to obtain $$\partial p_j^{ray}/\partial v_k.$$

In an embodiment, the learned face probabilities, $\phi$, may be used to importance sample topologies chosen during training, using an algorithm shown in TABLE 3.

TABLE 3

ALGORITHM 3: Topology importance sampling.

```
1 Function importanceSampledBitVector(Scene s, Probability φ):
2     for k ∈ s.faces do
3         u ← randomUniform( );
4         if u < φ_k then t_k ← 1;
5         else t_k ← 0;
6     return t
```

Importance sampling the topology based on the learned face probabilities may improve convergence as training examples are focused on difficult regions, and empty or solid space can quickly be culled. Note that optimization converges even when $\phi_i$ is initialized to equal 0,∀i.

Figure 2C:
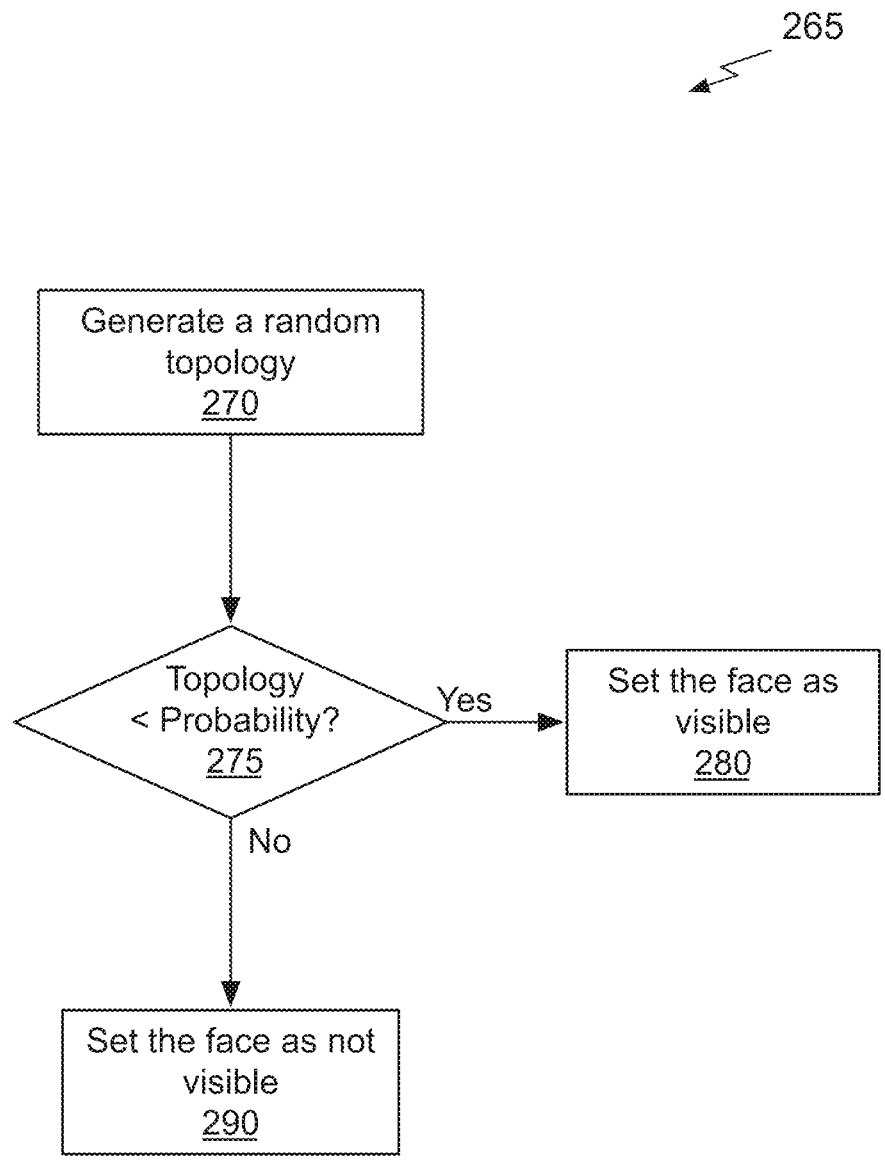
FIG. 2C illustrates a flowchart of a method for importance sampling a topology based on probability values suitable for use in implementing some embodiments of the present disclosure.

FIG. 2C illustrates a flowchart of a method 265 for importance sampling a topology based on probability values suitable for use in implementing some embodiments of the present disclosure. At step 270, the topology generation unit 135 generates a topology 136 including a visibility bit for each face of the volumetric mesh 130. Step 275 and either step 280 or step 290 are performed for each face of the topology 136. At step 275, the topology generation unit 135 determines if the topology value for a face is less than the probability value for the face, and, if so, at step 280 the visibility bit for the face is set. Otherwise, at step 290, the visibility bit for the face is not set.

To encourage well-formed meshes and simplify uv-mapping, the optimization may be initialized with a dense 3D grid and a probability, $\phi$, may be assigned to each grid cell. Rather than relying on marching cubes, each cell may be tessellated into 12 triangles, two per side, where all of the triangles for a grid cell share the cell's probability $\phi_k$. Sharing a single probability value for all faces of the cell provides a more constrained optimization problem compared with having a unique probability value per triangle. Importantly, provided that the volumetric mesh 130 does not overlap or self-intersect, the resulting mesh is manifold.

The vertex positions $v_k$ are optimized allowing the volumetric mesh 130 vertices to move to better match the object surface. Tangent space can be inferred from the vertices and faces for a given topology, and textures may be trained containing normal perturbations and material attributes, representing a tangent space normal map, $k_n$, textured diffuse albedo, $k_d$, and specular parameters, $k_s$ (i.e., metalness and roughness).

The algorithm shown in TABLE 1 may be applied hierarchically in a coarse-to-fine scheme by periodically increasing the resolution of the grid during training. The intermediate result of the coarser resolution effectively works as a good initial guess, and thus improved convergence substantially.

Figure 3A:
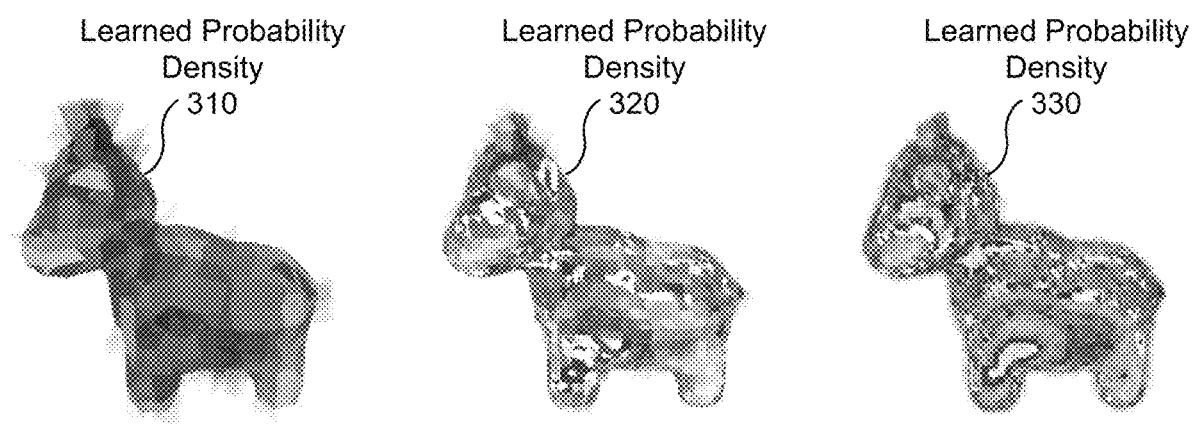
FIG. 3A illustrates a conceptual diagram of coarse-to-fine hierarchical training, in accordance with an embodiment.

FIG. 3A illustrates a conceptual diagram of coarse-to-fine hierarchical training, in accordance with an embodiment. Training starts using a grid size of 16 cells in each direction (x, y, and z) to produce a learned probability density 310. The grid size is subdivided once in each dimension to produce the learned probability density 320 improving the smoothness and fidelity of the silhouette compared with the learned probability density 310. The grid size is subdivided twice again in each dimension to produce the learned probability density 330, further improving the smoothness and fidelity of the silhouette.

Figure 3B:
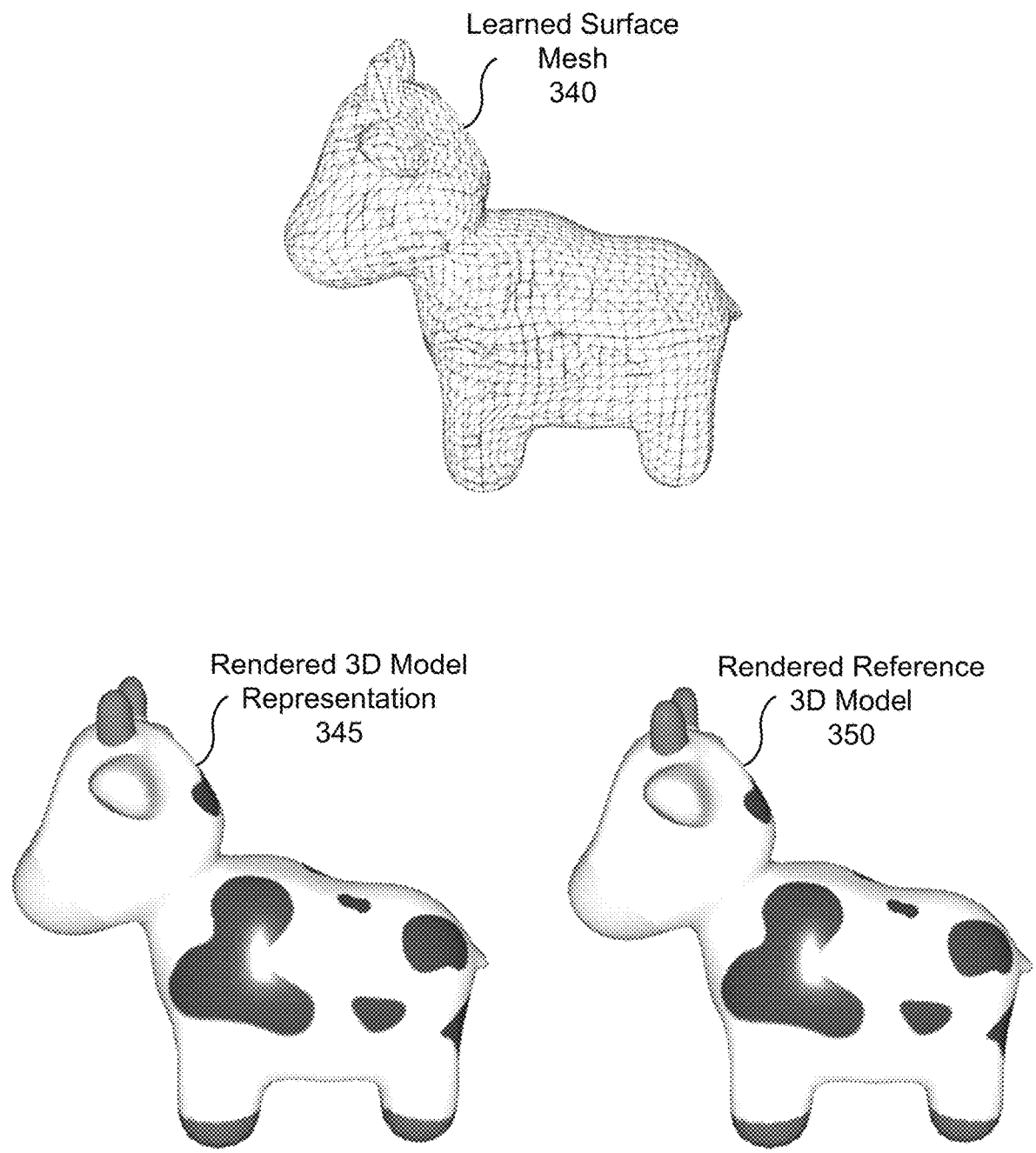
FIG. 3B illustrates a conceptual diagram of a learned surface mesh, rendered 3D model representation, and rendered reference 3D model, in accordance with an embodiment.

FIG. 3B illustrates a conceptual diagram of a learned surface mesh 340, rendered 3D model representation 345, and rendered reference 3D model 350, in accordance with an embodiment. The learned surface mesh 340, comprises the faces on the surface of the dense volumetric mesh after optimization. In an embodiment, vertices and faces inside the dense volumetric mesh are removed to produce the learned surface mesh 340. In an embodiment, faces of the dense volumetric mesh that have learned probabilities below a threshold value are removed to produce the learned surface mesh 340. In an embodiment, the learned surface mesh 340 includes opaque triangular faces, where positions of vertices are learned in an optimized topology. The 3D model representation 122 also includes learned material attributes and the rendered 3D model representation 345 appears nearly identical to the rendered reference 3D model 350.

In an embodiment, the image space losses are back propagated through the rendering pipeline to update the initial 3D model and improve visual similarity between the sets of images and reference images. In an embodiment, the image space losses are back propagated as gradients that indicate the effect of moving mesh vertex positions and adjusting other parameters has on the set of images. Operations performed by the rendering pipeline to produce the set of images are differentiable, so that the gradients may be computed for backpropagation.

Figure 3C:
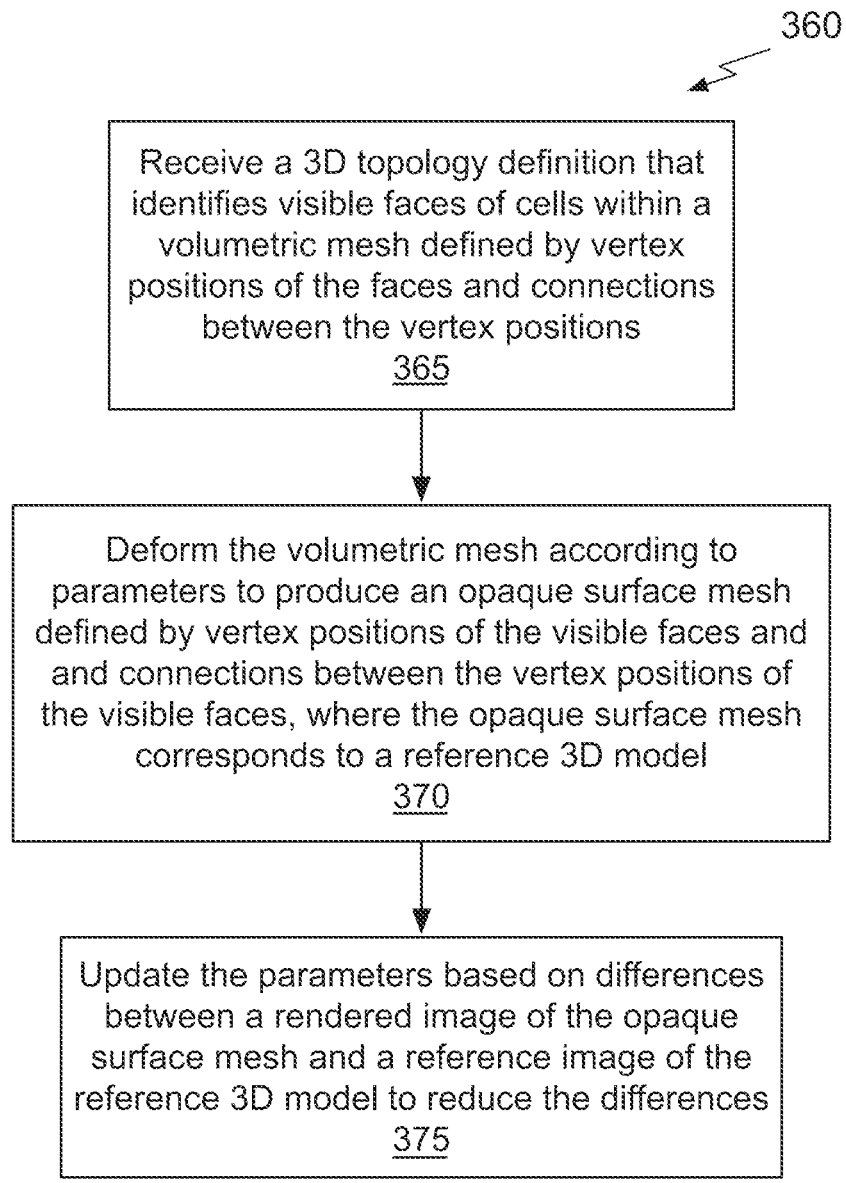
FIG. 3C illustrates a flowchart of another method for shape and appearance driven automatic 3D modeling suitable for use in implementing some embodiments of the present disclosure.

FIG. 3C illustrates a flowchart of another method 360 for shape and appearance driven automatic 3D modeling suitable for use in implementing some embodiments of the present disclosure. Each block of method 360, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 360 is described, by way of example, with respect to the shape and appearance driven 3D modeling system 150 of FIG. 1D. However, this method may additionally or alternatively be executed by any one system, or any combination of systems, including, but not limited to, those described herein. Furthermore, persons of ordinary skill in the art will understand that any system that performs method 360 is within the scope and spirit of embodiments of the present disclosure.

At step 365, a 3D topology definition is received that identifies visible faces of cells within a volumetric mesh defined by vertex positions of the faces and connections between the vertex positions. In an embodiment, the 3D topology definition is output by the topology generation unit 135 and the 3D topology definition identifies visible faces of cells within the volumetric mesh 130.

At step 370, the volumetric mesh is deformed according to parameters to produce an opaque surface mesh defined by vertex positions of the visible faces and connections between the vertex positions of the visible faces, where the opaque surface mesh corresponds to a reference 3D model. In an embodiment, the 3D model representation 122 generated by the 3D model generation unit 140 comprises the deformed volumetric mesh. In an embodiment, the volumetric mesh is a dense 3D grid that is deformed to define the shape of the 3D model representation 122 for the 3D topology definition.

At step 375, the parameters are updated based on differences between a rendered image of the opaque surface mesh and a reference image of the reference 3D model to reduce the differences. In an embodiment, the parameters 142 are updated based on image space losses 162. In an embodiment, the method 240 is used to update the parameters. In an embodiment, steps 370 and 375 are repeated for additional 3D topology definitions, wherein the additional 3D topology definitions are different compared with the 3D topology definition. In an embodiment, the additional 3D topology definitions are defined based on computed probability values for the cells within the volumetric mesh that indicate a likelihood that each cell is intersected by a ray corresponding to the reference image. In an embodiment, the method 200 is used to compute the probability values. In an embodiment, the method 265 is used to generate the additional 3D topology definitions.

End-to-end optimization of shape and appearance of triangle models is challenging over changing topologies. The optimization task is therefore formulated over a distribution of topologies, which enables gradient-based optimization. Furthermore, the expected value is estimated over the distributions by tracing rays through Monte Carlo sampled topologies which enables a very efficient implementation. The topology sampling technique enables learning of topology, shape and appearance jointly for triangle meshes from image observation. Additionally, by importance sampling the distribution of possible topologies, an optimization may be achieved through inverse rendering using a randomly sampled topology for each training iteration.

Parallel Processing Architecture

Figure 4:
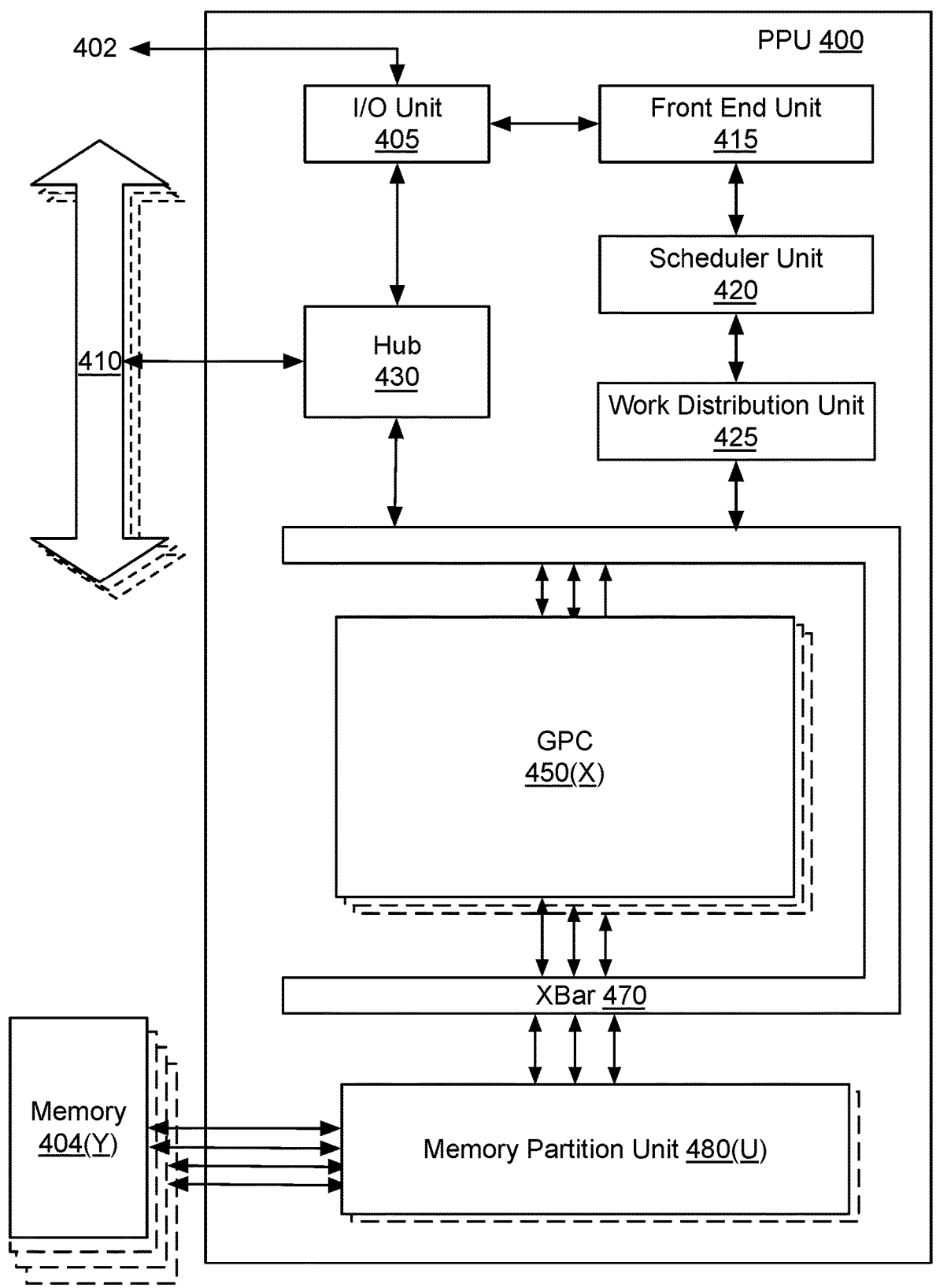
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the shape and appearance driven 3D modeling system 150. The PPU 400 may be used to implement one or more of the topology generation unit 135, 3D model generation unit 140, probability rendering unit 155, differentiable renderer 145, or image space loss unit 160. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
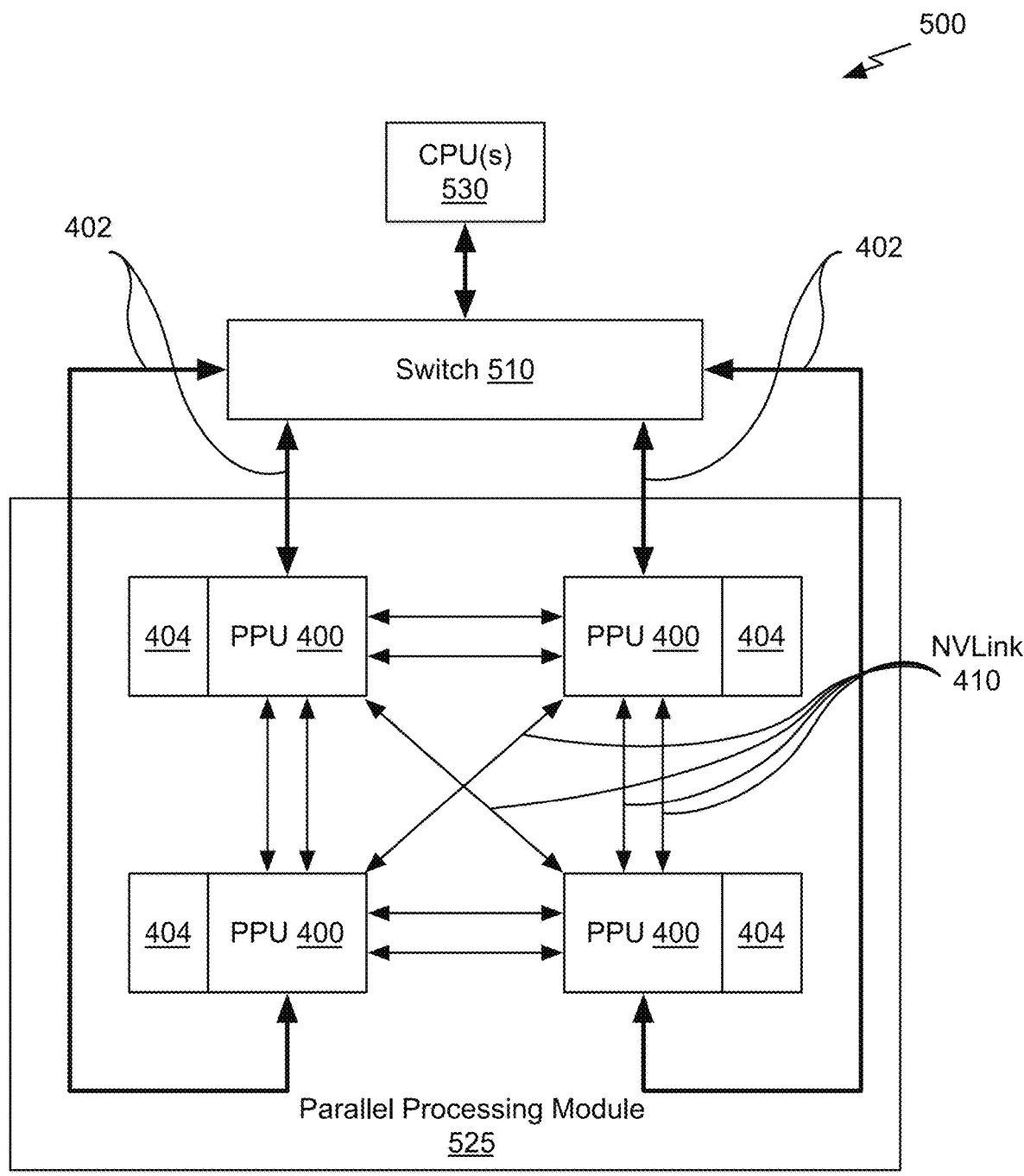
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the shape and appearance driven 3D modeling system 150 and/or the method 170 shown in FIG. 1E. The processing system 500 includes a CPU 530, switch 510, and multiple PPUs 400, and respective memories 404.

Figure 5B:
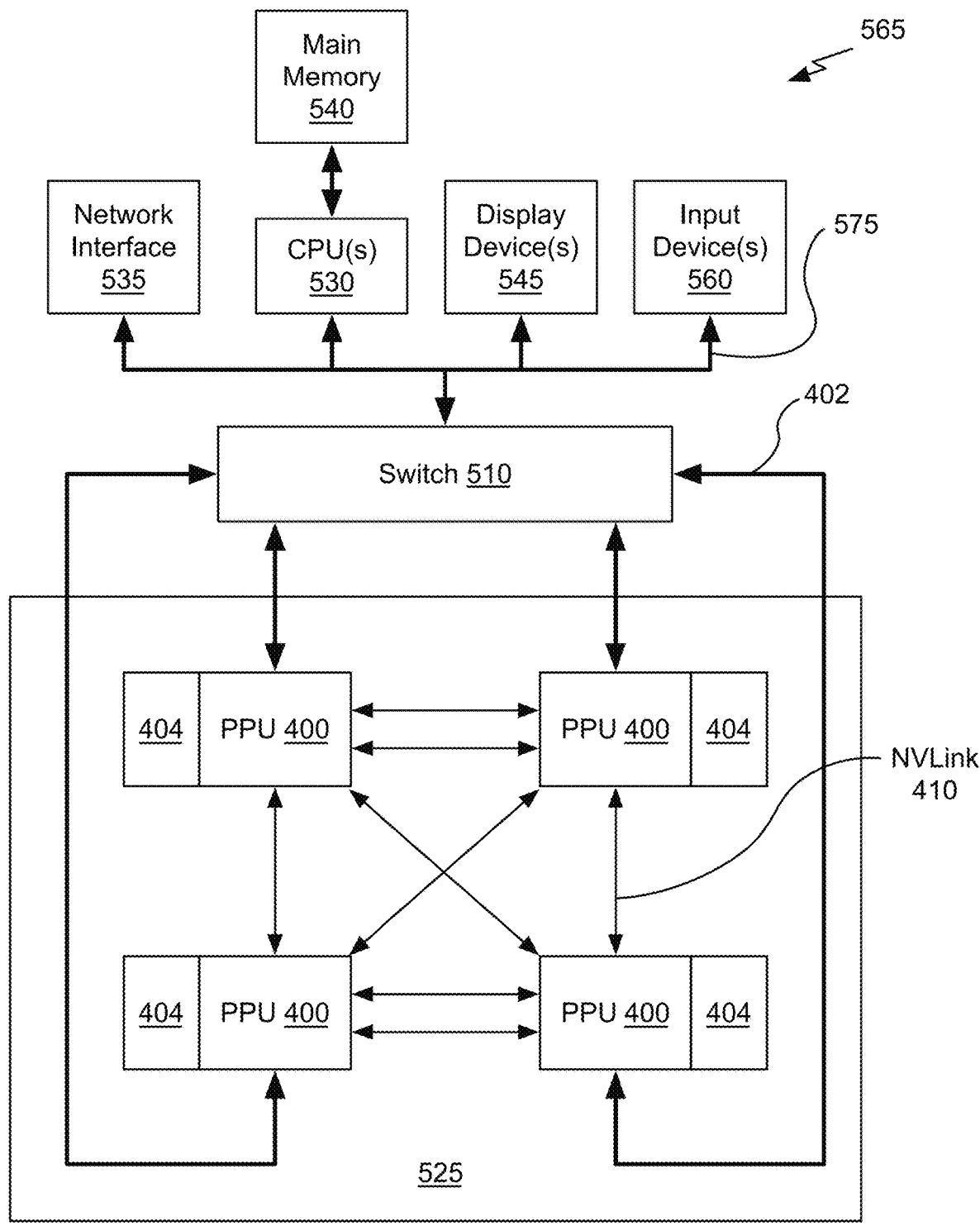
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the shape and appearance driven 3D modeling system 150, the method 170 shown in FIG. 1E, and/or the method 360 shown in FIG. 3C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
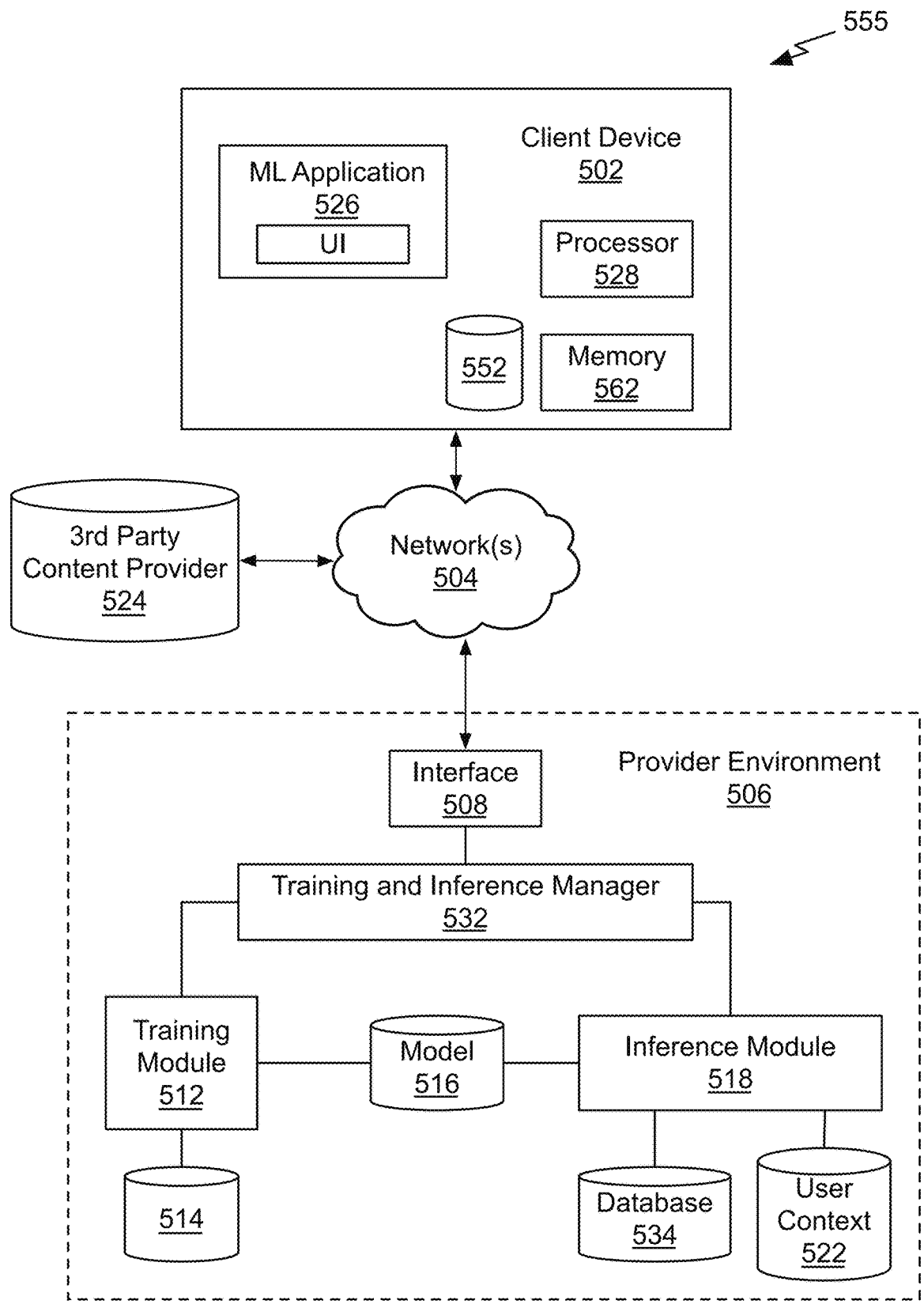
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
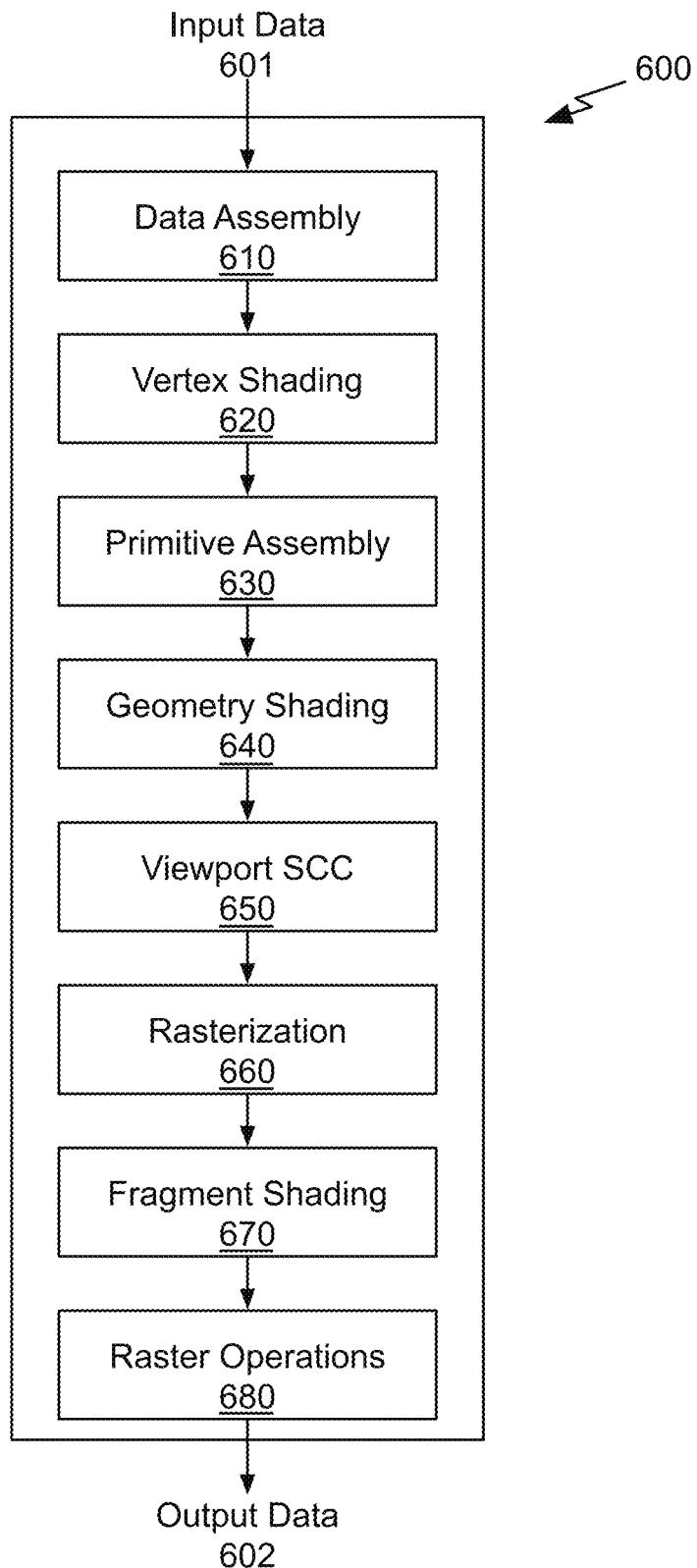
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.)

that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
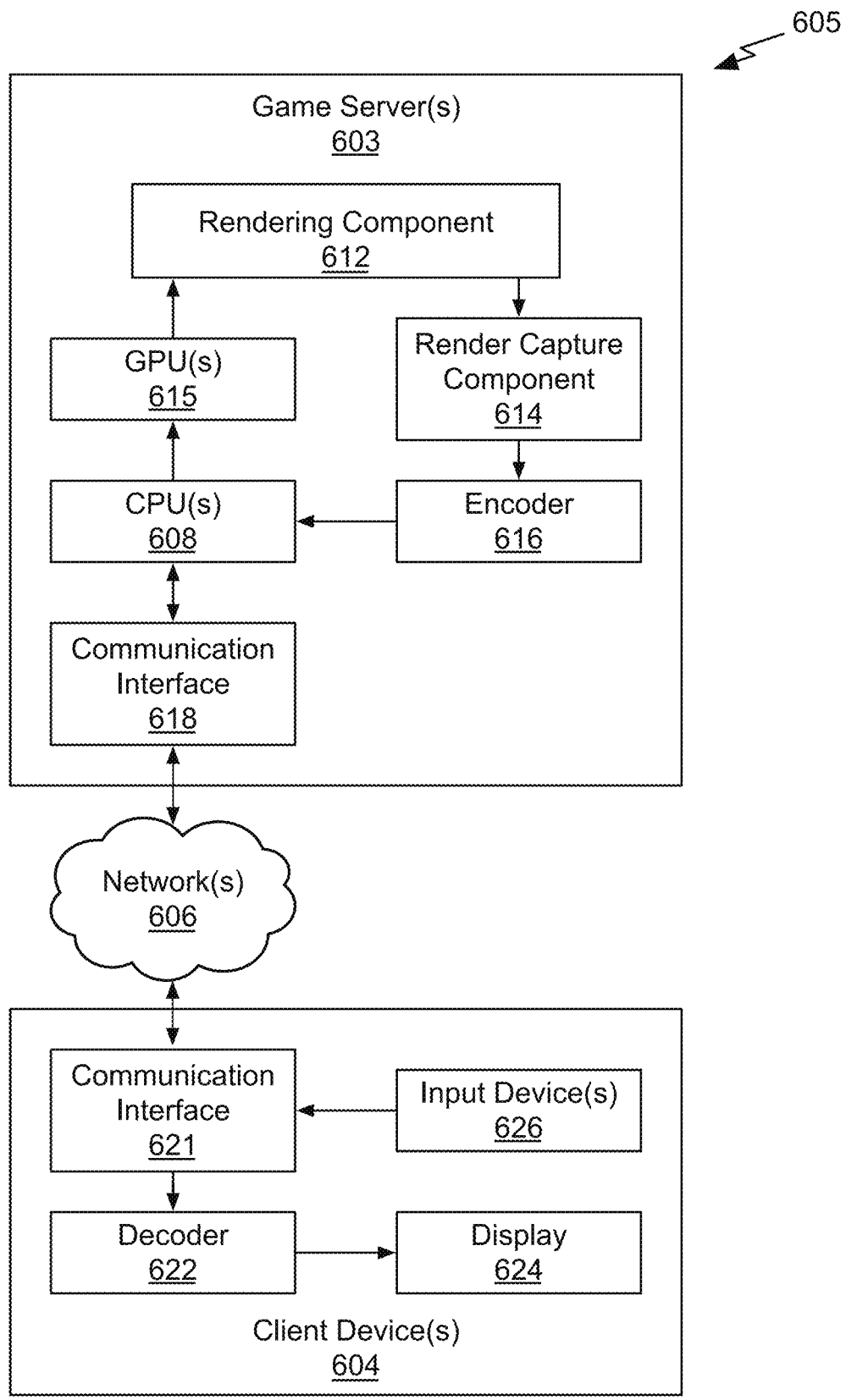
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for constructing a three-dimensional (3D) model, comprising:
receiving a 3D topology definition that identifies faces of cells within a volumetric mesh;
processing the 3D topology definition and the volumetric mesh according to parameters to predict a 3D model representation corresponding to a reference 3D model, wherein the 3D model representation comprises a surface mesh defined by vertex positions of faces and connections between the vertex positions;
rendering the 3D model representation to produce a rendered image;
transporting rays corresponding to the rendered image through the 3D model representation to compute probability values for the cells; and
updating the parameters based on the probability values and differences between the rendered image and a reference image of the reference 3D model to reduce the differences.

2. The computer-implemented method of claim 1, wherein the faces of the surface mesh are opaque.

3. The computer-implemented method of claim 1, further comprising:
rendering additional images associated with different camera positions or light positions;
transporting additional rays corresponding to the additional rendered images through the 3D model representation to compute additional probability values for the cells; and
updating the parameters based on the additional probability values and additional differences between the additional rendered images and additional reference images of the reference 3D model that correspond to the different camera positions or light positions to reduce the additional differences.

4. The computer-implemented method of claim 1, wherein the 3D model representation comprises spatially varying material attributes.

5. The computer-implemented method of claim 1, wherein the rendered images are produced using a differentiable renderer and the differences are propagated backwards through the differentiable renderer to update the parameters.

6. The computer-implemented method of claim 1, wherein each probability value is associated with a different face of each one of the cells.

7. The computer-implemented method of claim 1, wherein each probability value is associated with all faces of each one of the cells.

8. The computer-implemented method of claim 1, wherein the processing, rendering, transporting, and updating comprise a training iteration and further comprising repeating the training iteration for additional 3D topology definitions.

9. The computer-implemented method of claim 8, wherein the 3D topology definition and additional 3D topology definitions are randomly generated for each training iteration.

10. The computer-implemented method of claim 8, wherein at least one of the additional 3D topology definitions is determined based on the probability values.

11. The computer-implemented method of claim 8, wherein the volumetric mesh is subdivided for at least one of the additional 3D topology definitions.

12. The computer-implemented method of claim 1, wherein the volumetric mesh is initialized as a uniform 3D grid.

13. The computer-implemented method of claim 1, wherein the rendering and transporting are performed in parallel.

14. The computer-implemented method of claim 1, wherein updating comprises:
computing a pixel probability value for each pixel in the rendered image using the probability values;
scaling the difference for each pixel by the probability value for the pixel to compute products; and
summing the products to generate an image loss.

15. The method of claim 1, wherein the volumetric mesh is a dense volumetric mesh.

16. A system, comprising:
a processor that constructs a three-dimensional (3D) model by:
receiving a 3D topology definition that identifies faces of cells within a volumetric mesh;
processing the 3D topology definition and the volumetric mesh according to parameters to predict a 3D model representation corresponding to a reference 3D model, wherein the 3D model representation comprises a surface mesh defined by vertex positions of faces and connections between the vertex positions;
rendering the 3D model representation to produce a rendered image;
transporting rays corresponding to the rendered image through the 3D model representation to compute probability values for the cells; and
updating the parameters based on the probability values and differences between the rendered image and a reference image of the reference 3D model to reduce the differences.

17. The system of claim 16, wherein the faces of the surface mesh are opaque.

18. The system of claim 16, wherein the rendered images are produced using a differentiable renderer and the differences are propagated backwards through the differentiable renderer to update the parameters.

19. The system of claim 16, wherein the processor is further configured to update the parameters by:
computing a pixel probability value for each pixel in the rendered image using the probability values;
scaling the difference for each pixel by the probability value for the pixel to compute products; and
summing the products to generate an image loss.

20. A non-transitory computer-readable media storing computer instructions for constructing a three-dimensional (3D) model that, when executed by one or more processors, cause the one or more processors to perform the steps of:
receiving a 3D topology definition that identifies faces of cells within a volumetric mesh;
processing the 3D topology definition and the volumetric mesh according to parameters to predict a 3D model representation corresponding to a reference 3D model, wherein the 3D model representation comprises a surface mesh defined by vertex positions of faces and connections between the vertex positions;

rendering the 3D model representation to produce a rendered image;

transporting rays corresponding to the rendered image through the 3D model representation to compute probability values for the cells; and updating the parameters based on the probability values and differences between the rendered image and a reference image of the reference 3D model to reduce the differences.

21. The non-transitory computer-readable media of claim 20, wherein the faces of the surface mesh are opaque.

22. A computer-implemented method for constructing a three-dimensional (3D) model, comprising:

receiving a 3D topology definition that identifies visible faces of cells within a volumetric mesh defined by vertex positions of the faces and connections between the vertex positions;

deforming the volumetric mesh according to parameters to predict an opaque surface mesh defined by vertex positions of the visible faces and connections between the vertex positions of the visible faces, wherein the opaque surface mesh corresponds to a reference 3D model; and updating the parameters based on differences between a rendered image of the opaque surface mesh and a reference image of the reference 3D model to reduce the differences.

23. The computer-implemented method of claim 22, further comprising repeating the deforming and the updating for additional 3D topology definitions, wherein the additional 3D topology definitions are different compared with the 3D topology definition.

24. The computer-implemented method of claim 23, wherein the additional 3D topology definitions are defined based on computed probability values for the cells within the volumetric mesh that indicate a likelihood that each cell is intersected by a ray corresponding to the reference image.

* * * * *